(12) United States Patent
Smith

(10) Patent No.: US 7,805,344 B2
(45) Date of Patent: Sep. 28, 2010

(54) SYSTEM PROVIDING METHODOLOGY FOR CONSOLIDATION OF FINANCIAL INFORMATION

(75) Inventor: Debra Smith, Waterloo (CA)

(73) Assignee: Sybase, Inc., Dublin, CA (US)

( * ) Notice: Subject to any disclaimer, the term of this patent is extended or adjusted under 35 U.S.C. 154(b) by 1953 days.

(21) Appl. No.: 10/708,584

(22) Filed: Mar. 12, 2004

(65) Prior Publication Data

US 2005/0246269 A1 Nov. 3, 2005

(51) Int. Cl.
G06Q 40/00 (2006.01)

(52) U.S. Cl. .......................................... 705/35; 705/37
(58) Field of Classification Search .............. 705/35–45
See application file for complete search history.

(56) References Cited

U.S. PATENT DOCUMENTS

| | | | |
|---|---|---|---|
| 4,321,672 A | 3/1982 | Braun et al. | 705/42 |
| 4,989,141 A | 1/1991 | Lyons et al. | 705/36 |
| 5,189,608 A | 2/1993 | Lyons et al. | 705/30 |
| 5,644,727 A | 7/1997 | Atkins | 705/40 |
| 5,689,651 A | 11/1997 | Lozman | 705/37 |
| 5,749,077 A | 5/1998 | Campbell | 705/36 |
| 5,754,655 A * | 5/1998 | Hughes et al. | 705/70 |
| 5,819,263 A | 10/1998 | Bromley et al. | 707/3 |
| 5,841,970 A | 11/1998 | Tabuki | 713/201 |
| 5,842,211 A | 11/1998 | Horadan et al. | 707/10 |
| 5,864,683 A | 1/1999 | Boebert et al. | 709/249 |
| 5,893,079 A | 4/1999 | Cwenar | 705/36 |
| 5,913,202 A | 6/1999 | Motoyama | 705/35 |
| 5,995,947 A | 11/1999 | Fraser et al. | 705/38 |
| 6,023,684 A | 2/2000 | Pearson | 705/35 |
| 6,029,147 A | 2/2000 | Horadan et al. | 705/35 |
| 6,049,783 A | 4/2000 | Segal et al. | 705/37 |
| 6,070,152 A | 5/2000 | Carey et al. | 705/35 |
| 6,092,121 A | 7/2000 | Bennett et al. | 709/250 |
| 6,128,602 A | 10/2000 | Northington et al. | 705/35 |
| 6,327,628 B1 | 12/2001 | Anuff et al. | 719/311 |
| 6,513,019 B2 | 1/2003 | Lewis | 705/35 |

(Continued)

OTHER PUBLICATIONS

ECMA International, ECMAScript Language Specification, ECMA-262, Edition 3, Corresponds to JavaScript v. 1.5, Chapters 1-13, ECMA International, Mar. 24, 2000.

*Primary Examiner*—Jagdish N Patel
*Assistant Examiner*—Kevin Poe
(74) *Attorney, Agent, or Firm*—John A. Smart; G. Mack Riddle

(57) ABSTRACT

A system providing methodology for consolidation of financial information is described. In one embodiment, for example, a system is described for consolidating financial transaction information from multiple sources for presentation to a user, the system comprises: a file importer for importing data files from a first source and processing each data file to create parsed information for each transaction present in the data file and represent any additional information present in the data file in Extensible Markup Language (XML) format; a data consolidator for receiving parsed information from the file importer, consolidating the parsed information with transaction information from a user-accessible system to create consolidated transaction records, assigning a unique identifier to each consolidated transaction record for an account, and storing the consolidated transaction records; and a reporting module for receiving a request for financial transaction information for a particular account and presenting consolidated transaction records for the particular account to the user in response to the request, wherein the user may navigate through the consolidated transaction records based upon the unique indentifier.

47 Claims, 6 Drawing Sheets

U.S. PATENT DOCUMENTS

| | | | |
|---|---|---|---|
| 6,668,253 B1* | 12/2003 | Thompson et al. | 707/10 |
| 6,711,715 B1* | 3/2004 | Grealish | 715/206 |
| 6,760,414 B1 | 7/2004 | Schurko et al. | 379/93.12 |
| 6,772,131 B1 | 8/2004 | Francis et al. | 705/35 |
| 6,772,146 B2 | 8/2004 | Khemlani et al. | 707/3 |
| 6,792,422 B1 | 9/2004 | Stride et al. | 707/6 |
| 6,839,686 B1 | 1/2005 | Galant | 705/36 |
| 6,856,970 B1* | 2/2005 | Campbell et al. | 705/35 |
| 6,985,926 B1* | 1/2006 | Ferlauto et al. | 709/206 |
| 7,194,402 B2* | 3/2007 | Poplawski | 704/3 |
| 7,310,615 B2* | 12/2007 | Lewis | 705/35 |
| 2001/0056387 A1* | 12/2001 | Magary et al. | 705/30 |
| 2002/0004773 A1* | 1/2002 | Xu et al. | 705/36 |
| 2002/0042795 A1* | 4/2002 | Smith | 707/201 |
| 2002/0044684 A1* | 4/2002 | Pelly | 382/166 |
| 2002/0046484 A1* | 4/2002 | Lundgren | 47/29.6 |
| 2002/0065752 A1* | 5/2002 | Lewis | 705/35 |
| 2002/0072922 A1* | 6/2002 | Suzuki et al. | 705/1 |
| 2003/0097327 A1* | 5/2003 | Anaya et al. | 705/37 |
| 2003/0097331 A1* | 5/2003 | Cohen | 705/39 |
| 2003/0120619 A1* | 6/2003 | Osborn | 706/19 |
| 2005/0096927 A1* | 5/2005 | Mehta et al. | 705/1 |
| 2005/0172137 A1* | 8/2005 | Hopkins | 713/185 |
| 2006/0041493 A1* | 2/2006 | Schulze et al. | 705/35 |
| 2006/0080255 A1* | 4/2006 | Riehl et al. | 705/45 |
| 2006/0082055 A1* | 4/2006 | Chen | 273/126 R |
| 2006/0143239 A1* | 6/2006 | Battat et al. | 707/201 |

* cited by examiner

SYSTEM PROVIDING METHODOLOGY FOR CONSOLIDATION OF FINANCIAL INFORMATION

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Mar. 12, 2004, 7:26 am, size: 32.3 KB; Object ID: File No. 1; Object Contents: Source Code.

BACKGROUND OF INVENTION

1. Field of the Invention

The present invention relates generally to data processing environments and, more particularly, to a system providing methodology for consolidation of financial information.

2. Description of the Background Art

Historically, banking operations have involved a number of time consuming and tedious tasks for both individuals and businesses requiring banking services. Examples of time consuming consumer banking processes include visiting a branch or bank center, paying bills by paper check (and mailing them), and balancing checkbooks. Businesses also have had similar issues, but in the case of business banking an even larger number and types of banking transactions (particularly, a larger number of transactions) are typically involved.

In addition, banking operations have also historically involved dealing with large quantities of information, much of which was historically maintained and exchanged in paper format. More recently, the exchange of financial information between banking and financial organizations has been automated. Banks having been exchanging information electronically for a number of years and today most of the information exchanges between banks is handled electronically.

While banks have exchanged information electronically for a number of years, for much of this period most consumers and businesses continued to conduct banking transactions in the traditional, paper-oriented fashion. However, with the growth of the Internet, online banking has automated a number of these processes for businesses and consumers. Online banking can save time by enabling bank customers to access their accounts and perform various banking transactions when (and where) it is convenient. As a result, online banking has been growing in popularity in recent years.

Another recent trend is that businesses and other organizations are facing an increasing need to cut costs and deliver services with fewer resources while, at the same time, finding new sources of revenue. To meet this challenge, corporate treasurers and other financial professionals are increasingly seeking banking solutions that allow them to efficiently manage their entire organization's cash position in an easy-to-use format. In addition, by moving from paper-based processing to electronic processing, corporations are able to eliminate inefficient and error prone processes.

Although online banking provides increased efficiency and ease-of-use, problems remain with the delivery of online banking services. One problem to be addressed by banks in providing consumers and businesses with online access to banking information is that this information is typically maintained in a number of different formats and at a number of different locations. In addition, banks and financial institutions also usually have a number of different sources of financial information (e.g., BAI (Bank Administration Institute), SWIFT (Society for Worldwide Interbank Financial Telecommunication), back-end, and/or proprietary files). For example, a given bank may typically exchange files containing banking information with other banks (including federal banks) on a regular basis (e.g., several times per day). The bank may, for instance, receive files in a BAI (Bank Administration Institute) file format from other banks four times per day. In addition to the information received in files from other banks, the bank also typically has other "live" (user-accessible) information that is available in the bank's bank-end systems. This "live" information is often maintained in proprietary formats in the bank's internal systems.

Bank customers want to receive a complete, consolidated report of activity relating to a particular account in a convenient, easy to use format. However, the number of sources of banking information and the different formats in which such information is maintained makes it difficult for the bank to consolidate and report accurate and complete information to its customers. Also, banking information received from external sources may also duplicate entries that have already been made in internal systems, so the solution needs to be able to reconcile the information received from different sources.

Another issue to be addressed is that the quantity of information relating to particular accounts may be quite large, particularly in the case of accounts maintained by a large corporation. This volume of information can make it difficult for the bank to consolidate and report account information to the customer in a manner in which the customer can understand. On a given day, a corporate customer may have hundreds or even thousands of transactions relating to particular accounts. A member of a corporation's financial staff may have difficulty understanding and using transaction information relating to these accounts unless he or she can easily navigate through this information (e.g., paging through the information using a browser interface or the like).

What is needed is a solution which consolidates financial information from a number of different sources, enabling accurate and complete information to be presented in a format that is easy to navigate and use. Ideally, the solution should provide a means for storing historical account information which enables accurate and complete information to be retrieved efficiently. The solution should also facilitate the viewing and navigation of large quantities of data, such as large collections of financial transactions. The present invention provides a solution for these and other needs.

SUMMARY OF INVENTION

A system providing methodology for consolidation of financial information is described. In one embodiment, for example, a system of the present invention is described for consolidating financial transaction information from multiple sources for presentation to a user, the system comprises: a file importer for importing data files from a first source and processing each data file to create parsed information for each transaction present in the data file and represent any additional information present in the data file in Extensible Markup Language (XML) format; a data consolidator for receiving parsed information from the file importer, consolidating the parsed information with transaction information from a user-accessible system to create consolidated transaction records, assigning a unique identifier to each consolidated transaction record for an account, and storing the consolidated transaction records; and a reporting module for receiving a request for financial transaction information for a particular account and presenting consolidated transaction records for the particular account to the user in response to the request, wherein the user may navigate through the consolidated transaction records based upon the unique identifier.

In another embodiment, for example, a computer-implemented method of the present invention is described for consolidating and presenting financial information to a user, the method comprises steps of: importing data files of different types; for each particular type imported, loading a file adapter suited for processing that particular type; for each imported data file, creating parsed information from the data file that identifies each transaction present in the data file with a unique sequence number, and that represents any additional information present in the data file in XML format; creating consolidated financial information by storing all parsed information in a consolidation repository; receiving a user request at a user-accessible system for information about a particular financial account; and in response to the user request, determining financial information in the user-accessible system and the consolidation repository that is most current for the particular financial account, and presenting that financial information to the user.

In yet another embodiment, for example, a computer-implemented system of the present invention is described for consolidating and presenting financial information to a user comprises: a file importer for importing data files of different types; a plurality of file adapters, each file adapter suited for processing a particular type of data file imported by creating parsed information from the data file that identifies each transaction present in the data file with a unique sequence number, and by representing any additional information present in the data file in XML format for each imported data file; a consolidation repository for storing consolidated financial information; a user-accessible system for receiving a user request for information about a particular financial account; and a module for determining financial information in the user-accessible system and the consolidation repository that is most current for the particular financial account, and presenting that financial information to the user.

DETAILED DESCRIPTION

Glossary

Figure 1:
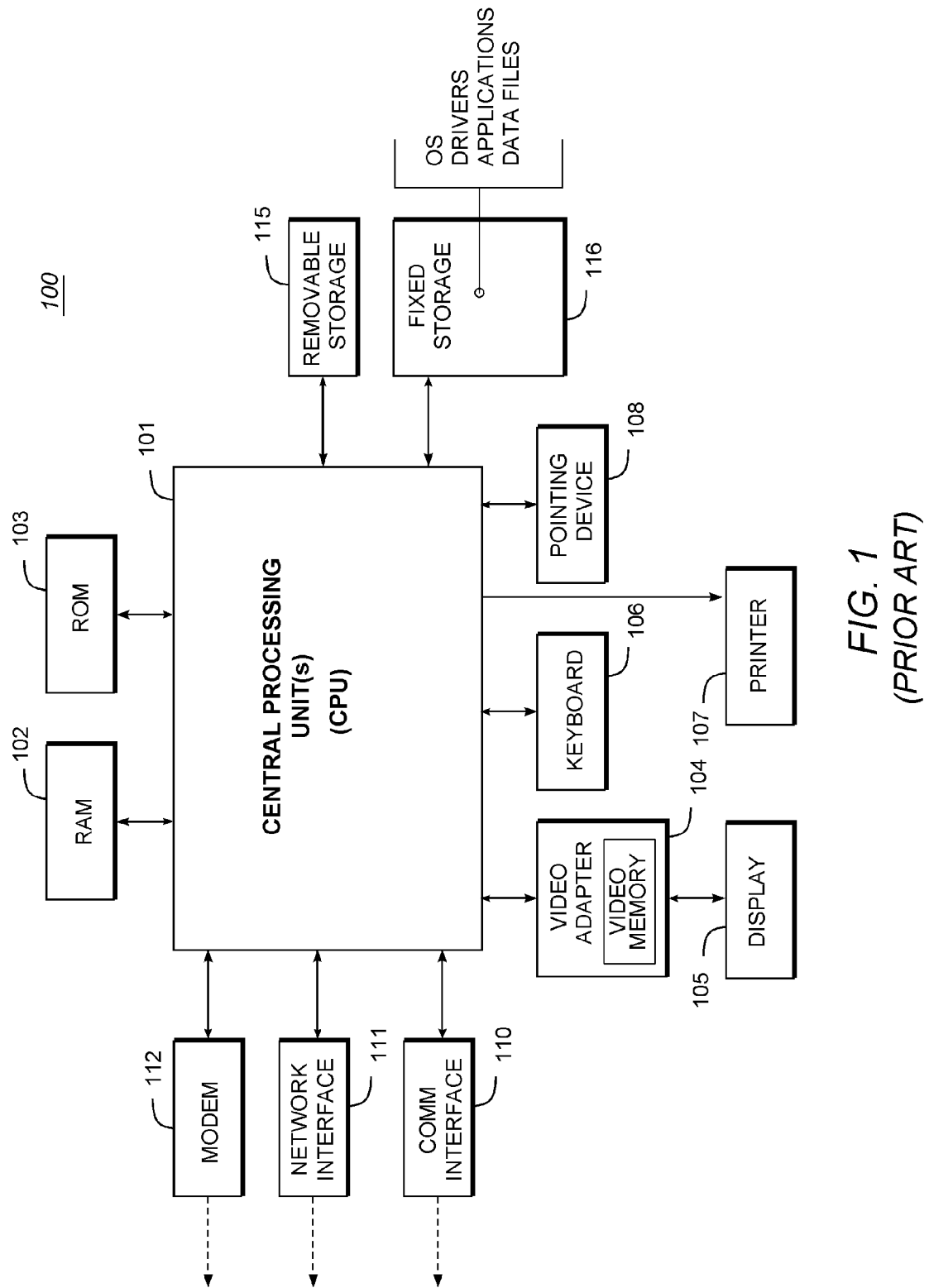
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

BAI: The BAI (Bank Administration Institute) file format is considered the de-facto standard by most banks and corporations. While all banks claim to conform to the BAI format, banks frequently customize BAI files by adding their own fields or lines to the files.

Bytecode: A virtual machine executes virtual machine low-level code instructions called bytecodes. Both the Sun Microsystems Java virtual machine and the Microsoft NET virtual machine provide a compiler to transform the respective source program (i.e., a java program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A "Java compiler" translates source code written in the Java programming language into bytecode for the Java virtual machine.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., at TR/REC-html40 currently made available at w3.org.

J2EE: "J2EE" is an abbreviation for Java 2 Platform Enterprise Edition, which is a platform-independent, Java-centric environment from Sun Microsystems for developing, building and deploying Web-based enterprise applications. The J2EE platform consists of a set of services, APIs, and protocols that provide functionality for developing multi-tiered, web-based applications. For further information on J2EE, see e.g., "Java 2 Platform, Enterprise Edition Specification, version 1.4", from Sun Microsystems, Inc., the disclosure of which is hereby incorporated by reference. A copy of this specification is available via the Internet (e.g., at j2ee/j2ee-1_4-fr-spec.pdf currently made available at java.sun.com.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper", Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2", from Sun Microsystems, the disclosure of which is hereby incorporated by reference. A copy of this documentation is available via the Internet (e.g., at j2se/1.4.2/docs/index.html-currently made available at java.sun.com.

JavaScript: JavaScript was designed by Netscape as an easy-to-use object-oriented scripting language that serves as an adjunct to the Java programming language. JavaScript is a small, lightweight language that is designed to be embedded in other products and applications, such as Web browsers. Inside a host environment, JavaScript can be connected to the objects of its environment to provide programmatic control over such objects. JavaScript code can be added to standard HTML pages to create interactive documents and has found considerable use in the creation of interactive Web-based forms. Most modern browsers, including those from Microsoft and Netscape, contain JavaScript support. For additional information on JavaScript, see e.g., "Core JavaScript Guide 1.5", from Netscape, the disclosure of which is hereby incorporated by reference. A copy of this documentation is available via the Internet (e.g., currently made available at devedge.netscape.com).

JavaServer Pages (JSP) is a web-scripting technology similar to Netscape server-side JavaScript (SSJS) or Microsoft Active Server Pages (ASP). JSP is a presentation layer technology that sits on top of a Java servlets model and makes working with HTML easier. It allows a developer to mix static HTML content with server-side scripting to produce dynamic output. By default, JSP uses Java as its scripting language; however, the specification allows other languages to be used, just as ASP can use other languages (such as JavaScript and VBScript). For further description of JavaServer Pages, see e.g., "JSR-000152 JavaServer Pages 2.0 Specification", available from Sun Microsystems. A copy of this specification is available via the Internet (e.g., currently at /aboutJava/communityprocess/final/jsr152/ made available at jcp.org).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Portal: A portal provides an individualized or personalized view of multiple resources (e.g., Web sites) and services. A portal typically offers a single access point (e.g., browser page) providing access to a range of information and applications. A portal assembles information from a number of different sources (e.g., Web sites and applications) enabling a user to quickly receive information without having to navigate to a number of different Web sites. A portal also typically enables a user to obtain a personalized view of information and applications by organizing and grouping information and services for presentation to users. A portal may be considered to be composed of one or more portlets.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., at /rfc/rfc1180.txt currently made available at ietf.org).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., at TR/REC-xml currently made available at w3.org-).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
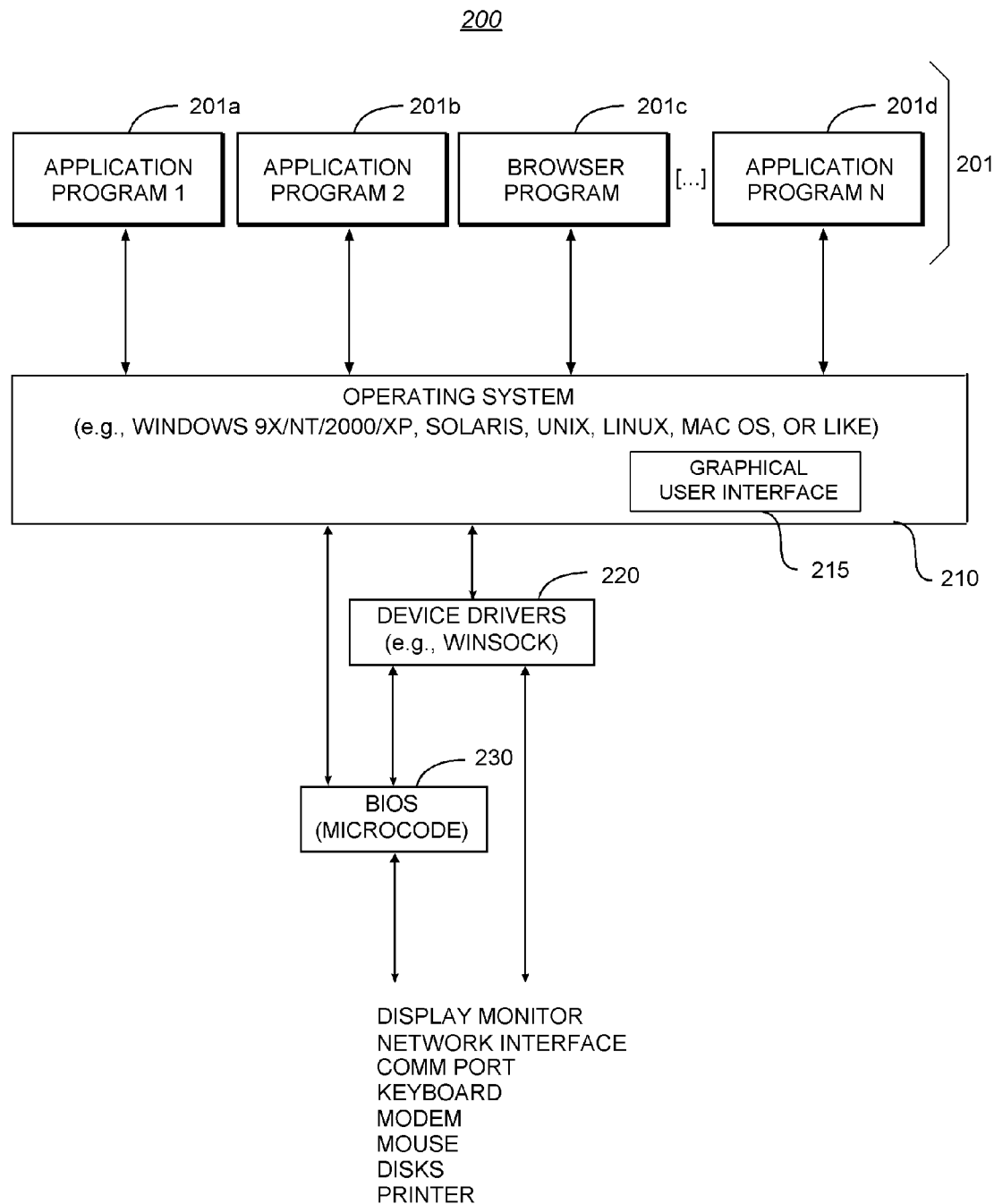
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver —Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of System and Methodology for Consolidation of Financial Information Introduction Before describing the operations of the system and methodology of the present invention for consolidation of financial information, the environment in which the system may be implemented will be briefly described. In its currently preferred embodiment, the present invention is commercially embodied as a component of the Financial Fusion (trademark) Corporate Banking Solution ("Corporate Banking Solution"). The Corporate Banking Solution, which is based on Java 2 Enterprise Edition (J2EE) components, allows users to manage a wide variety of banking services from a single Web portal providing connectivity to a number of back-end systems. The solution uses JavaServer Pages (JSPs) to provide information to customers in a Web portal and includes back-endsystem connectivity tools facilitating customization of the solution to address specific customer requirements.

The Corporate Banking Solution design is modular; it is based on a series of application components that are integrated and yet can be customized to address particular customer requirements. It includes a framework that supports middleware services and provides tools to enhance and support customization and back-end integration. The solution includes three tiers: a Web tier; an application tier; and a back-end tier. These tiers work together to create the user interface (UI) and business logic solutions that make up the Corporate Banking Solution. Each of these tiers will be briefly described.

The Web tier includes static and dynamic presentation layers which work together to create a dynamic Web user interface. To develop a specific user interface (UI), a Web designer creates the HTML content and images for the JSP pages, and a Web developer would create supporting JSP tag libraries and beans. All of these elements reside on the Web tier. The static presentation layer typically consists of static HTML files and images that reside on a Web server. When a user accesses the portal (i.e., Web server), this layer provides any static information to the user interface. If the user requests information from a back-office database or makes some other interactive request, these actions are redirected to JSPs in the dynamicpresentation layer on the Corporate Banking Solution application server. The dynamic presentation layer consists of the JSPs, tag libraries, XML files, services, tasks, and Java Beans that provide dynamic content delivery over the Web. JSPs are redirected and processed by the application server. HTML is issued from the JSP layer and displayed through a Web browser.

The Application tier implements the business logic to complete requests made by the user using the Web tier (i.e., user interface). The Application tier includes the Corporate Banking and Business Central modules and a Core API (application programming interface) for receiving requests from the user interface (UI), forwarding them to the back-end systems, and returning responses from the back-end systems to the UI.

The solution is designed to operate with existing bank back-office/back-end systems without requiring any changes to these systems. Connectivity is established through existing access to the back-end systems using a variety of communications protocols supported by the solution. Additional external systems may include content providers, other financial institutions, billers, bill fulfillment providers, and so forth.

A bill payment and transfer warehouse component translates data entered via the Corporate Banking Solution into the respective API calls of the back-office systems. Backoffice systems perform the requested work and return the results to the user through the task-specific user interface (UI). Requests entered through the user interface can require information from a local operational database or from back-office systems. When a back-office system returns information, it is forwarded to the appropriate subsystem.

The Corporate Banking Solution provides an n-tier computing environment in which the business logic and data access are separate from the presentation and from each other, and only the presentation view resides on the client. The solution enables existing applications to access business logic and multiple data sources in a Web-based or distributed computing environment. Using an n-tier solution improves availability and scalability and provides improved access to the Corporate Banking Solution portal.

Figure 3:
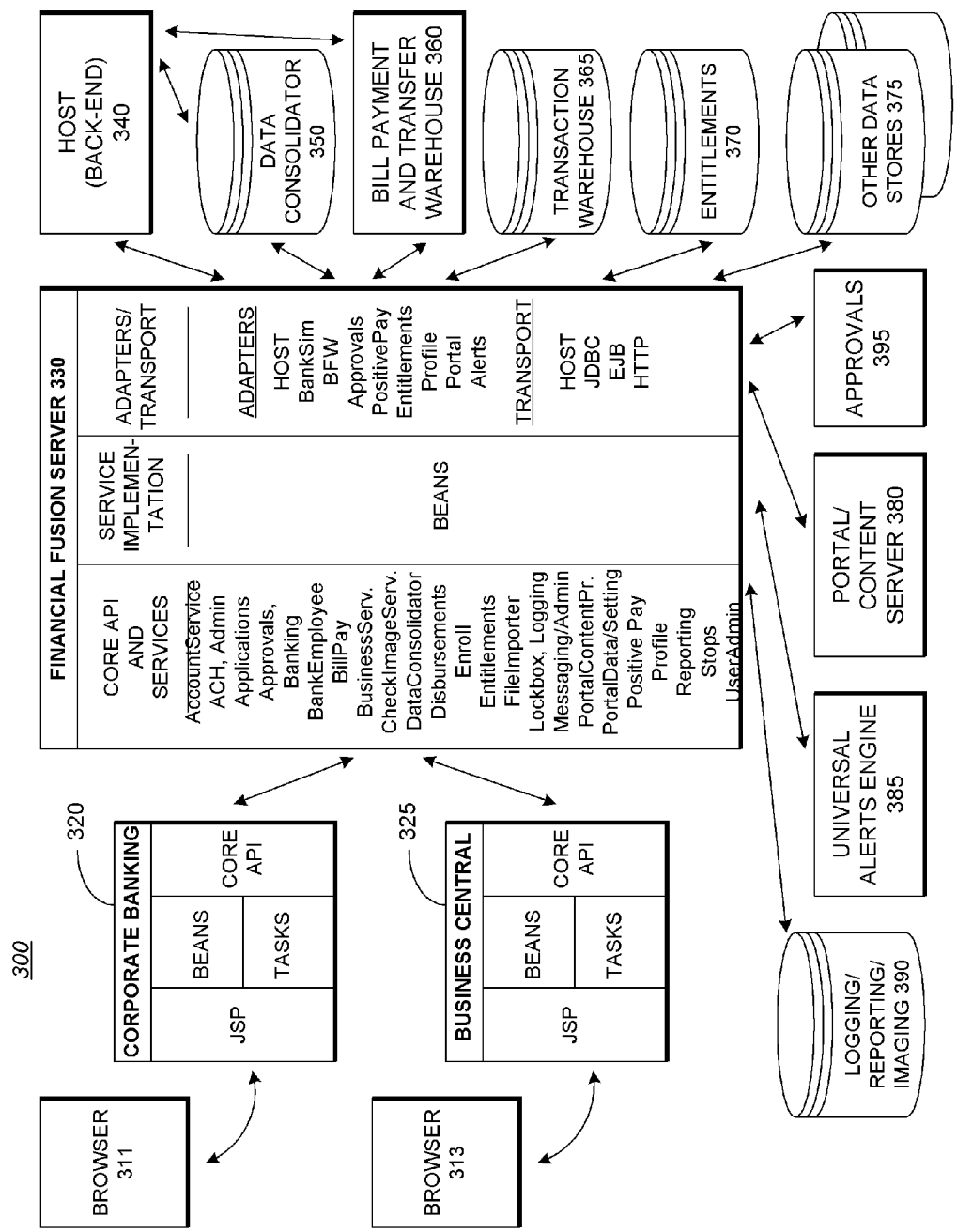
FIG. 3 is a block diagram of an environment in which the system of the present invention may be preferably embodied.

FIG. 3 is a block diagram of an environment 300 in which the system of the present invention may be preferably embodied. As shown, the Corporate Banking Solution in which the present invention is embodied comprises of a number of modules and supporting technologies and components. The browsers 311, 313 represent clients connected to the corporate banking module 320 and business central module 325, respectively. The corporate banking module 320 provides the JSPs, tasks, services, and beans that make up the core of the Corporate Banking Solution. Modules provided by the Corporate Banking Solution include administration, account management, cash management, positive pay, controlled disbursements, lockbox, payments and transfers, ACH (Automated Clearing House) and tax payments, reporting, alerts, messages, and check imaging.

Supporting applications and services are provided through the Financial Fusion Server 330. As shown, the services provided by the Financial Fusion Server 330 include, among others, entitlements, approvals, billpay, and, of particular interest, a data consolidator and a file importer which implement core methodology of the present invention for consolidation of financial information. The Financial Fusion Server 330 is connected to a number of backend systems and databases, including a host (back-end) 340, a data consolidator (repository) 350, a bill payment and transfer warehouse 360, a transaction warehouse 365, an entitlements database 370, a portal/content server 380, an (universal) alerts engine 385, a logging/reporting/imaging repository(ies) 390, an approvals system (module) 395, and other data stores and repositories 375. The following discussion will focus on those modules of the Corporate Banking Solution which implement the methodology of the present invention for consolidation of financial information.

Consolidation, Storage, and Display of Financial Information

The system and methodology of the present invention provides a single, local repository for banking/account information that consolidates information that may originate from a number of different sources, including BAI files, SWIFT, back-end systems, and proprietary files. The system stores information from these different sources in a central repository (sometimes referred to herein as the "data consolidator repository") in a manner which improves the performance of the retrieval of banking/account information compared to prior solutions which typically provide for retrieval of the information from a remote back-end (BE) system. The system provides a means for efficiently storing historical account data. In addition, it provides common reporting schemes and paging mechanisms which provide users with easy access to the information in the data consolidator repository. The paging mechanisms supported by the present invention include a paging application programming interface (API) for large datasets, such as large collections of transactions. As described below, the paging API enables the solution to present financial information to users in a manageable form that facilitates user navigation of the information.

The system and methodology of the present invention also provides for extensibility. Each customer (e.g., bank or other financial institution) may have its own custom information available in BAI files and/or in the back-end systems that provide information to the data consolidator. A file importer module processes financial institution-supplied files (for example, BAI files) with each type of file handled by a particular file adapter. The file importer provides a pluggable architecture in that it can be extended to support additional file types, including proprietary file types. For example, a particular bank can write additional file adapters to support particular proprietary file types used within the bank.

Another important aspect of the system and methodology of the present invention is that the solution provides flexibility to enable imported files (e.g., BAI files) to be "undone" when necessary. On occasion BAI files can contain errors that need to be corrected. However, correcting these errors can result in complications in providing the paging/navigation support for presenting the financial information to users. The present invention provides two paging schemes for enabling imported files to be "undone". A customer (e.g., a bank) typically selects one of these two paging schemes depending on the frequency of bad files (i.e., files with errors) that are encountered and various other factors. The components of the currently preferred embodiment of the system of the present invention will next be described.

System Components

Figure 4:
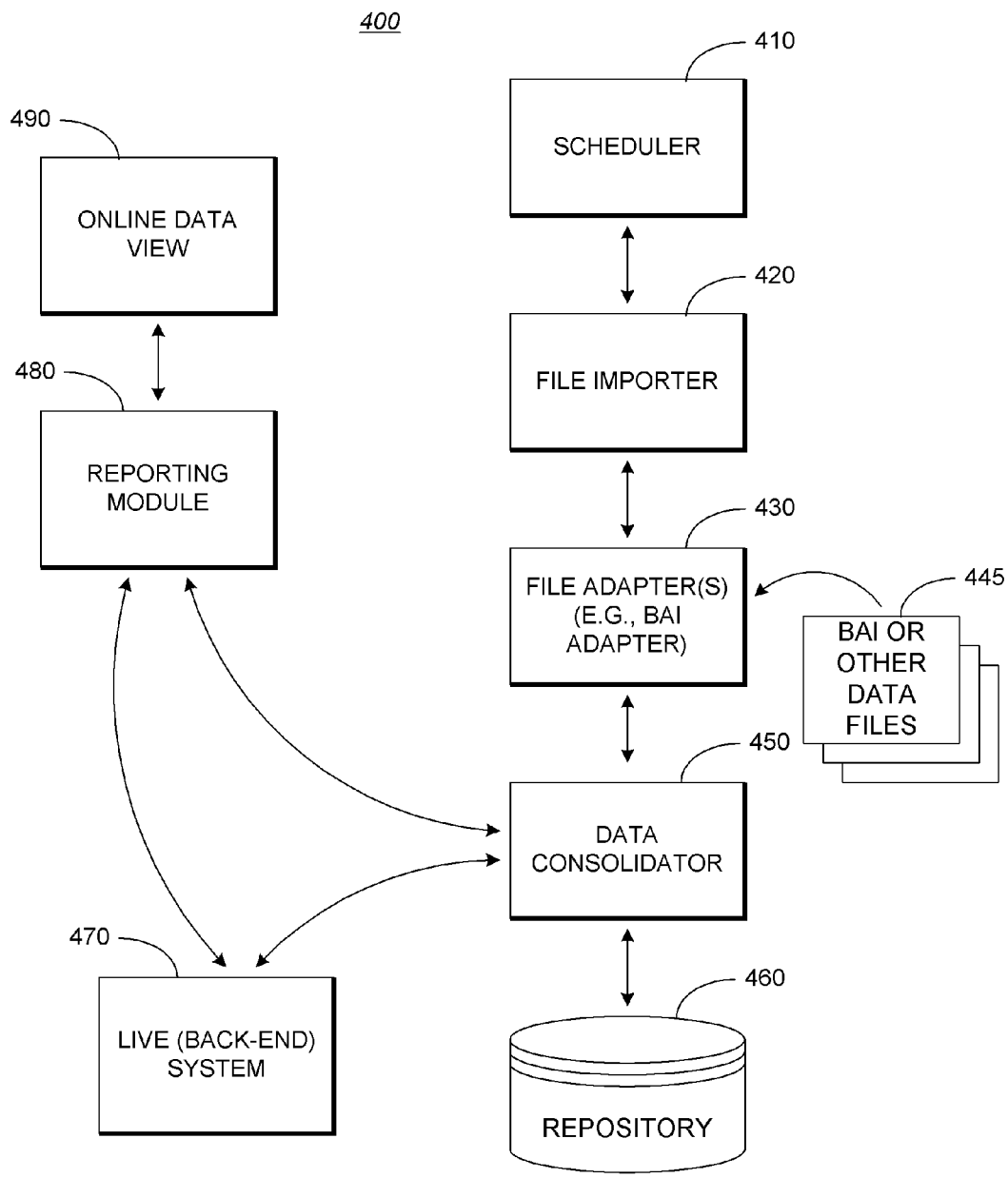
FIG. 4 is a block diagram of an environment illustrating the components of the system of the present invention and their operations in further detail.

FIG. 4 is a block diagram of an environment 400 illustrating the components of the system of the present invention and their operations in further detail. As shown, environment 400 includes a scheduler 410, a file importer 420, a file adapter(s) 430, a data consolidator 450, a repository 460, a live system 470, a reporting module 480, and an online data view 490. As also shown at FIG. 4, BAI or other data files 445 are received by the file adapter 430. These components of the system of the present invention and their operations are described below.

The scheduler 410 provides logic for triggering events. For example, a bank using the system of the present invention may receive a set of BAI files from a federal bank four times per day. In this case, the bank would set up the scheduler 410 to provide that four times per day the scheduler 410 would invoke the file importer 420 for processing the files (e.g., BAI files) received from the federal bank. The scheduler 410 would typically call the file importer 420 passing a parameter indicating the type of files (e.g., files of type BAI) that are to be processed.

When invoked by the scheduler 410, the file importer 420 loads the appropriate file adapter 430 for processing the type of files indicated by the scheduler 410. For example, if the specified file type is BAI, the file importer 420 loads a BAI file adapter. However, if another file type was specified (e.g., a proprietary bank file type), a different file adapter would be loaded from the file adapter(s) 430. The file adapter 430 processes each of the data files 445 it receives (e.g., in a configured directory) and it knows how to parse the file format of these data files. For example, a BAI file adapter processes BAI data files 445 as shown at FIG. 4. Currently, the file adapter(s) 430 processes data files and converts the file data into a Java representation. In processing the files, the file adapter 430 invokes various application programming interfaces (APIs) on the data consolidator 450 to store the data in the repository 460.

One of the complications in processing data files and storing them in the repository 460 is that banks (and other financial institutions) frequently customize and/or extend the BAI file format to provide additional fields or lines to the BAI files. Accordingly, the system of the present invention must allow for the inclusion of additional (extra) information in the BAI files. The data consolidator 450 provides for handling and storing this additional (or "extra") information which is not defined as a standard data element in the repository 460. In the currently preferred embodiment, the data consolidator 450 creates an Extensible Markup Language (XML) representation of the additional information which is stored in the repository 460. Also, when information from the BAI file is retrieved from the repository 460 for presentation to a user, all of the information in the source file (e.g., the BAI file), including this additional (extra) information is reassembled for presentation to the user.

The other "standard" information from the data files (e.g., BAI files) that are processed by the system are stored in columns and rows of a database. For example, each of the standard categories of information in a BAI file is stored in a particular column of the database. The additional XML mechanism is provided to deal with additional, custom information that financial institutions frequently include in BAI files.

The data consolidator 450 also provides for retrieval of information from the repository 460 for presentation to users in a manner that enables the users to navigate (e.g., page through) the information. This is particularly important as in many cases large volumes of transactions are posted to accounts (e.g., corporate bank accounts). In order to provide information in a format that users can understand and deal with, the data consolidator 450 must provide for appropriately processing the information before it is placed into the repository 460.

The methodology of the present invention provides for ordering the transaction information and assigning a transaction number (or sequence number) to each transaction before the transaction information is stored in the repository 460. More particularly, as account information is extracted from a BAI (or other) file, the information is assigned a sequence number (unique identifier) for the purpose of paging this information to the user in manageable groups or "chunks" of information (e.g., pages). Currently, information is sequenced per account and per type of information. For example, sequence numbers for account transactions on account 1111 are independent from account transactions on account 2222. Also, sequence numbers for lockbox transactions on account 1111 are independent from account transactions on account 1111. This allows the present invention to efficiently extract "pages" of information based on a range of sequence numbers for any particular account and type of information. The present invention currently provides for two alternative paging schemes that can be selected by an organization implementing the solution (e.g., a bank) depending on its environment and requirements. The two paging schemes are referred to as "consecutive" and "date-based" paging and are described in more detail below. The format of the sequence numbers that are assigned are based on which type of paging scheme the customer has selected. Generally, the "consecutive" scheme provides for assigning consecutive sequence numbers, while the "date-based" scheme provides for sequence numbers that include calendar date information and can accommodate gaps in sequencing.

By ordering the transaction information and assigning a transaction number, the information may be retrieved and presented to users (e.g., corporate customers of the bank implementing the solution) in pages which represent manageable "chunks" of the information. For example, a page displayed in the user interface may display a total of ten transactions. When the user requests information, the transaction number enables the first ten transactions to be displayed. The user may then review the next ten transactions by selecting a "next" button or the like in the user interface. This is considerably more user-friendly than presenting a huge list containing hundreds or thousands of transactions.

The live (user-accessible) system 470 typically contains the most recent information relating to particular accounts. As shown at FIG. 4, information is retrieved from the live (user-accessible) system 470 and stored in the repository 460 using the same APIs on the data consolidator 450 as described above for the BAI or other data files which are processed by the file importer 420 and file adapter(s) 430. In this fashion "live" data from bank's live (user-accessible) system 470 is consolidated with external data and stored in the repository 460. However, in this case, the data from the live system 470 goes straight to the data consolidator 450 and is not processed by an adapter (e.g., BAI adapter 430). Data from the live system may also be converted into a Java representation, or the data may already be in the appropriate format.

As a result of the above operations, the repository 460 includes a mixture of data from the processed data files 445 (e.g., data files received from external sources that were processed in accordance with an established schedule) and data obtained from the live, user-accessible system 470. Assume, for example, that a bank receives a set of BAI files once per day and processes these files each day at midnight. During a particular day, a user (i.e., bank account holder) may request account data for a particular account 1234. In response, the reporting module 480 may obtain current data from the live system 470 and use the data consolidator 450 to add the live data into the data consolidator's repository 460. The combined information from the live system and previously received data files relating to the particular account 1234 may then be displayed to the user in response to his or her request. The user may then issue a bill payment from this account at 2 pm in the afternoon of that same day. The data consolidator will update the account information to reflect the bill payment (based on information about the bill payment in the live system 470). That evening at midnight a new set of BAI files is received and processed, including a BAI file containing information relating to account 1234. The information in this BAI file may duplicate the information that came from the live system (e.g., because the BAI file includes a record of activity over the past 24 hours on account 1234). For example, the BAI file may include information reflecting the bill payment made from the account at 2 pm. When the system of the present invention processes data files (e.g., BAI files), the system will automatically purge any corresponding information in the repository which is marked as live from the user-accessible system. In this example, the bill payment record from the live system will be deleted as it is duplicated in the BAI file.

The online data view module 490 provides a user interface which provides users of the solution with an online view of the consolidated account information (e.g., transactions on the account such as the above-described bill payment) created and stored in the data consolidator repository. The online data view module represents the Web-based layer of the solution, which includes JSP pages and other components to provide a user with a view of banking/account information. The reporting module 480 provides the infrastructure that supports the online data view module 490. The reporting module 480 also provides users with the ability to generate reports. For example, the user may request reports concerning account balance details for a particular day, week, month, or other period. The reporting module 480 interacts with the data consolidator 450 to obtain the appropriate information and respond to the request. The data that is retrieved is then presented to the user by the reporting module 480 and/or the online data view module 490. The paging and navigation support provided by the invention for presenting information to users will next be described in more detail.

Paging and Navigation Support

A complication in providing users with the ability to navigate or "page-through" banking/account information presented through the data consolidator is that, as previously noted, in certain instances information extracted from a file (e.g., a BAI file) is in error and the BAI file must be "undone" to correct the error. For example, a federal bank or another bank that is sending information may make a mistake in information included in a BAI file that is received and processed by the system of the present invention. Accordingly, the system of the present invention takes into account the fact that one or more of these files may need to be corrected.

As described above, the system and methodology of the present invention provides for sequencing information per account and per type of information to enable the solution to efficiently extract "pages" of information based on a range of sequence numbers for any particular account and type of information. A file that must be undone may have caused the generation of sequence numbers in the middle of several ranges of sequence numbers. Accordingly, the system of the present invention currently provides both a "consecutive" paging scheme and a "date-based" paging scheme for addressing the problem of errors in processed data files. The solution is configurable so that a financial institution (e.g., bank) implementing the solution may select from these schemes based on its particular requirements.

With the "consecutive" paging scheme, transactions for an account or lockbox are numbered consecutively. In other words, there are no gaps in the sequence numbers. This paging scheme is the most efficient for retrieving a page of data as a page can typically be retrieved with a single query to the repository (database).

The disadvantage of this method is that when an erroneous BAI file needs to be undone, all BAI files that were processed after the erroneous file which contain dependent information also need to be undone. Dependent information would be any information for the same accounts and type of information contained in the file. For example, if file 1 contained account transactions for account 1111 and file 2 contained account transactions for account 1111, then file 2 contains dependent information. However, if file 1 contained account transactions for account 1111 and file 2 contained lockbox transactions for account 1111, then file 2 does not contain dependent information. Assume that file 1 and 2 both contained account transactions for account 1111 (i.e., file 2 was dependent on file 1) and file 1 was in error. In this case both File 1 and File 2 would need to be undone. Typically both would be undone, corrected, and then reprocessed. One can appreciate that if there are a large number of BAI files processed throughout the day, this could require correction and reprocessing of a considerable number of files. Accordingly, consecutive paging is typically used in bank environments in which BAI files (or other data files) rarely contain errors and/or in environments which process a relatively small number of BAI files.

For banks which frequently receive and process erroneous BAI files, or banks that process large numbers of data files, the file dependencies created by the consecutive paging scheme becomes inconvenient. To eliminate dependencies, and thus allow a single BAI file to be undone independently of any other file, the present invention also provides a "date-based" paging scheme. This paging scheme still numbers transactions per account and per type of information, but also numbers transactions within a particular day. The sequence number (unique identifier) assigned to a transaction comprises the date (e.g., 20040223) followed by a sequence index (1, 2, 3, etc.). This mechanism still provides for ascending sequence numbers, but provides for a jump in sequence when the date changes. This means that sequence numbers for any particular day are not generated from the last sequence number from the previous day. There are also a sufficiently large number of possible sequence numbers within a particular day that sequence numbers do not need to be consecutive within a day. This allows for leaving gaps in the sequencing when a file needs to be undone. In the event that a file is redone, the redone file would be inserted at the end of that day since there is no guarantee that it would fit into any existing gap created. In the presently preferred embodiment, the paging APIs which retrieve the "next" or "previous" page of entries in the data make multiple queries to the database (i.e., the data consolidator repository) in the event that a gap is encountered. Date-based paging has slightly more inefficient retrieval of paged data, but is more convenient with respect to undoing erroneous files.

Detailed Operation

Example of Operations in Presenting Consolidated Financial Information

Figure 5A:
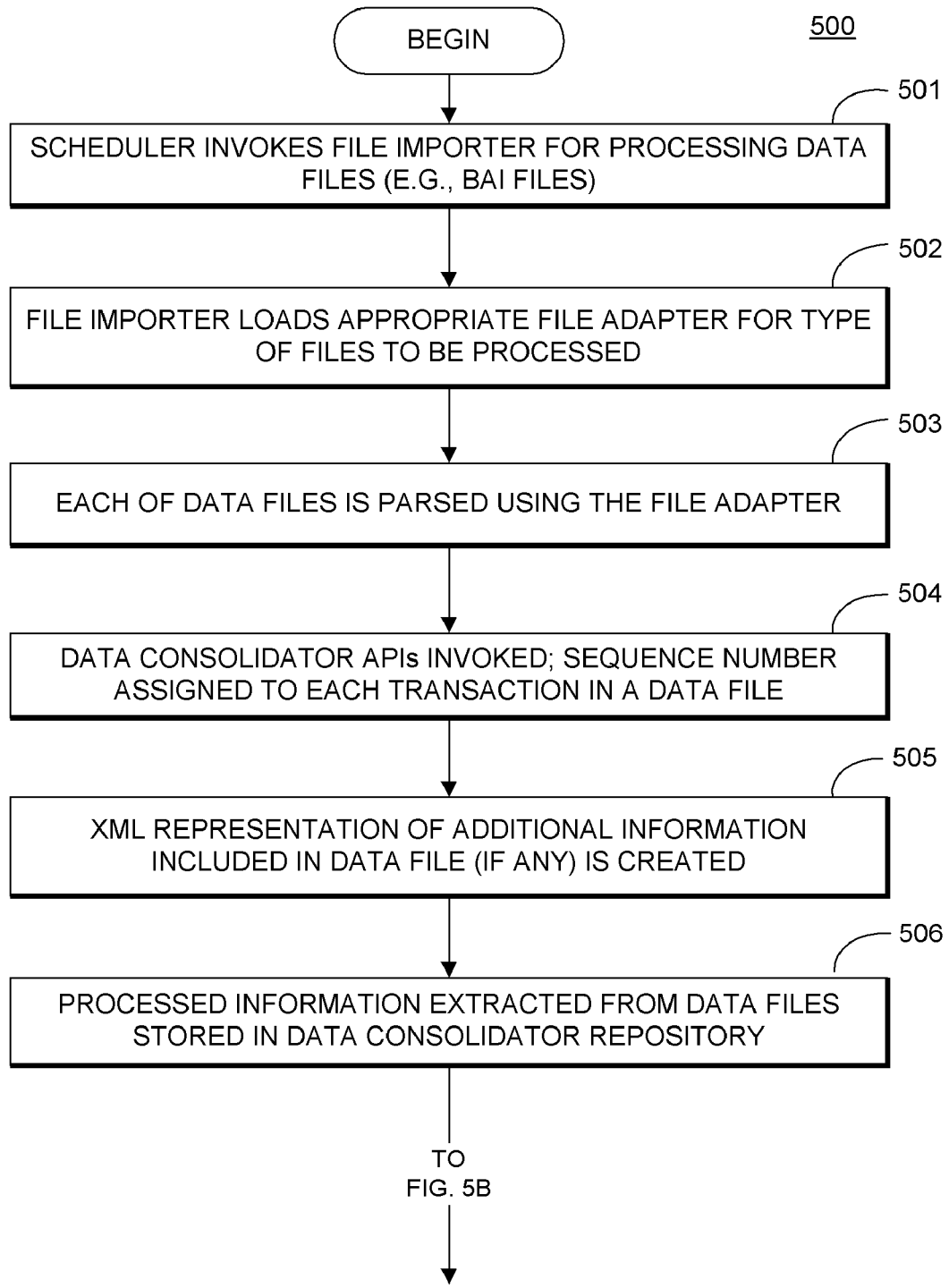
FIGS. 5A-B comprise a single flowchart illustrating the operations of the system of the present invention in consolidating financial information and presenting consolidated financial information to a user.
Figure 5B:
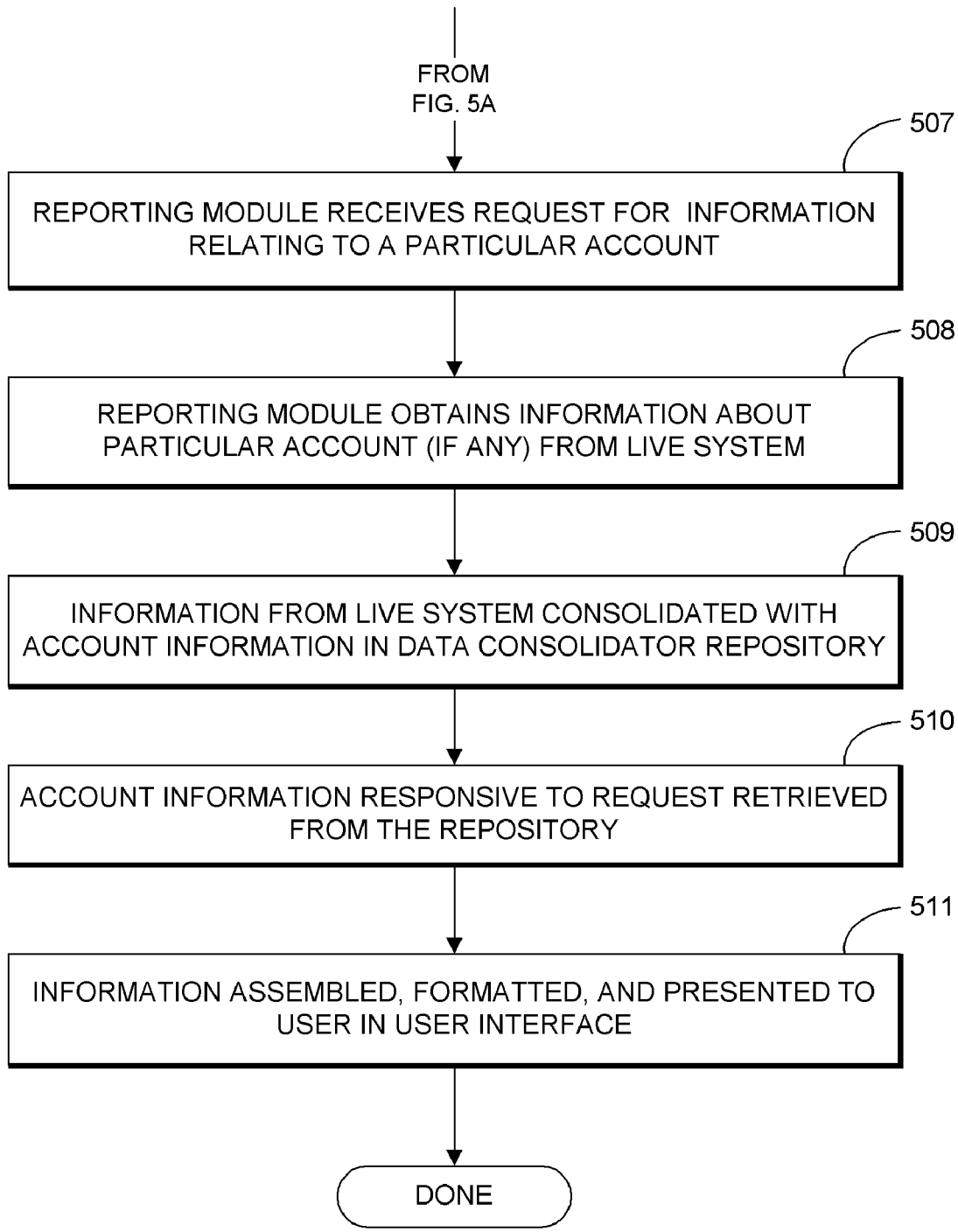

FIGS. 5A-B comprise a single flowchart illustrating the operations of the system of the present invention in consolidating financial information and presenting consolidated financial information to a user. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The following discussion will use an example of the consolidation of financial information by a bank based on information received from external sources (e.g., one or more other banks) with data from the bank's own live (or back-end) systems. Although this discussion refers to a bank, those skilled in the art will appreciate that the system and methodology could be used by other types of financial institutions, corporations, and other organizations wishing to consolidate financial information from different sources. Accordingly, this example is for purposes of illustrating the operations of the present invention and not for purposes of limitation.

The bank implementing the present invention may periodically receive data files containing financial information and may schedule the processing of these files. At step 501, the system's scheduler invokes the file importer module for processing files (e.g., BAI files) that have been received. As described above, the bank may use the system's scheduler to schedule the processing of these data files at periodic intervals (e.g., several times per day). The scheduler also indicates the type of files (e.g., files of type BAI) that are to be processed by the file importer.

At step 502, the file importer loads the appropriate file adapter for processing the type of files to be processed. If, for example, BAI files were received by the bank, the file importer loads a BAI file adapter for processing the BAI files. The file importer is a file processor which includes functionality for locating and processing financial institution-supplied files that are resident in the file system (for example, BAI files). Each file type is handled by a file adapter. As described above, the file importer is a pluggable architecture in that it can be extended to support additional file types, including proprietary file types.

At step 503, each of the data files is parsed using the file adapter that was loaded for processing the files. During processing the data files (e.g., BAI files), at step 504 the file adapter invokes various application programming interfaces (APIs) on the data consolidator and assigns a sequence number (unique identifier) to each transaction in the data file. As described above, the sequence number may be a consecutive sequence number or a date-based sequence number. At step 505, an XML representation of any additional information (if any) included in the file is created as part of this process. At step 506, the processed information extracted from the data files (including the XML representation, if any) is stored in the data consolidator repository. Currently, in the case of BAI files standard information is stored in database tables in the repository. The XML representation of any additional (or extra) data in the BAI files (if any) is also stored in the repository so that this additional information may retrieved and provided in response to user requests for information.

A user may subsequently request information about a particular account. At step 507, the reporting module receives a request for account information relating to a particular account. At step 508, the reporting module checks the live (back-end) system and obtains information relating to the account (if any) from the live system that is more recent than the information in the repository. This information from the live system (if any) is consolidated with the information stored in the data consolidator repository at step 509. Information in the live system which duplicates information already stored in the repository is ignored. However, information not yet reflected in the repository is sequenced and added to the repository.

At step 510, the account information responsive to the user's request is retrieved from the repository. The information is then assembled, formatted, and presented to the user in the user interface of the system at step 511. The user may then review the information and/or request additional information using the user interface. The user may, for example, select a "next" button provided in the presently preferred embodiment to view another page of account data. The core components of the system of the present invention and their operations are described in greater detail below.

Data Consolidator

General

At a high level, the data consolidator provides the means to consolidate account information in a database repository and retrieve that information. It also handles recording of historical data for accounts. An adapter module of the data consolidator (DCAdapter) contains the logic to store and retrieve information from a database repository.

It is invoked from a file adapter (e.g., the BAI Adapter) of the file importer, a data consolidator service, and also from other services (including banking, lockbox, and controlled disbursement). Requests come into the banking, lockbox, and disbursement services of the Corporate Banking Solution to retrieve information. The default data consolidator services implementation fulfills these requests by doing the following (this example shows a request to get recent transaction information):

call the back-end system to get any transactions that are more recent than the stored data;

store these new transactions in the data consolidator using DCAdapter.addTransactions; and call DCAdapter.getRecentTransactions to retrieve stored data.

The data consolidator implements paging in order to support retrieving large data sets. Each transaction/item is assigned a sequence number (implemented as transactionindex in the Transaction Java Bean). Generally, data must be inserted into the data consolidator in the order in which it should be viewed.

The data consolidator also uses database connection pooling. The DCAdapter uses a connection pooling utility class to gain access to database connections.

Related Components

In its currently preferred embodiment as a component of the Corporate Banking Solution, components used in the implementation of the data consolidator include an alerts engine delivery channel (e.g., used for database cleanup). Alerts registered with the alerts engine trigger scheduled cleanup of files. A user (e.g., system administrator) may set the schedules for cleaning up files using a universal alerts management console (e.g., to set timing of cleanup and information to be cleaned up).

Data Consolidator Java Beans

The data consolidator also makes use of two Java Beans (components) to support data file (e.g., BAI file) rollback capability. An ImportedFile Bean represents the file that has been imported using the file importer (FileImporter) as follows: int dataSource (e.g., BAI, etc.); String fileName; and Calendar fileDate. An ImportedFiles Bean represents a list of ImportedFile objects.

All of the Beans stored by the data consolidator's adapter extend an ExtendABean class. Any data contained by the ExtendABean base class will be stored in XML format in a DC_ExtendABeanXML table by calling setExtendABeanXML( ) passing in the XML retrieved from the database. When fetching an object from the database the ExtendABean data will be restored by calling getExtendABeanXML( ).

Every data consolidator table has an ExtendABeanXMLID column that contains an index into the DC_ExtendABean table. If a Bean does not have any ExtendABean data then the value of this column will be set to 0. If a Bean does have ExtendABean data then a unique index will be generated from the DC_RecordCounter table to be used as a key for the DC_ExtendABeanXML table. When storing the XML in the DC_ExtendABeanXML table it is currently broken up into 2,000 character segments and stored in the XMLSegment column. The order of the XML segment is preserved by storing the segment number in the XMLSegment number column.

Data Consolidator Tasks

GetBAIFileListByDate: This task calls into the data consolidator to get a list of files that have been processed for a specified date range.

GetDependentBAIFiles: This task calls into the data consolidator to get a list of dependent files based on the file selected. An ImportedFile Bean should be in session. If the task processes successfully, the DependantFileList collection object is added to session.

SetimportedFile: This task sets an ImportFile Bean in the session named (ImportedFile) based on property set. The template must set the collectionIndex by calling the setimportedFileIndex( ) method. An ImportedFileList Collection should be in session. If the task processes successfully, the ImportedFile is added to session.

UndoBAIBatch: This task calls into the data consolidator to remove a File and any specified dependent files. An ImportedFile Bean must be in session via (SetimportedFile Task). Task errors set in this task include ERROR_IMPORTED-FILE_NOT_FOUND.

Data Consolidator Service

The data consolidator service reads its configuration information from a dataconsolidator.xml configuration file. The file includes settings for the service itself, as well as settings for the data consolidator's adapter (DCAdapter). A sample configuration file is shown below:

```
 1: <XML>
 2: <DCADAPTER>
 3: <JAVA_CLASS>com.ffusion.dataconsolidator.DCAdapter
    </JAVA_CLASS>
 4: <DCADAPTER_SETTINGS>
 5:   <DB_PROPERTIES>
 6:     <Type>DB2</Type>
 7:     <DefaultConnections>10</DefaultConnections>
 8:     <MaxConnections>30</MaxConnections>
 9:     <User>db2inst1</User>
10:     <Password>db2inst1</Password>
11:     <InitNow>true</InitNow>
12:     <PoolType>FFI</PoolType>
13:     <ConnectionType>DB2:NET</ConnectionType>
14:     <Server>10.25.147.23</Server>
15:     <DBName>efsold</DBName>
16:     <Port>6789</Port>
17:   <PAGESIZE>40</PAGESIZE>
18:   </DCADAPTER_SETTINGS>
19: </DCADAPTER>
20: </XML>
```

The settings within the DCADAPTER tags are passed to the DCAdapter. Any other settings are for the data consolidator service itself.

The following is a brief description of the data consolidator service API methods:

API: initialize

Syntax: public void initialize( ) throws DCException

Description: Initialize the data consolidator service using the DCADAPTER settings in dataconsolidator.xml.

API: cleanup

Syntax: public cleanup(String type, int ageInDays, Hashmap extra) throws DCException Description: Removes all information of the specified type that is older than the specified number of days. Valid types are: All, Account histories, Account summaries, Account transactions, Lockbox summaries, Lockbox transactions, Lockbox credit items, Disbursement summaries, Disbursement transactions.

API: getAccountReportData

Syntax: public com.ffusion.reporting.IReportResult getAccountReportData (ReportCriteria criteria, java.util.HashMap extra) throws DCException Description: Gets the report data matching the specified report criteria.

API: getImportedFileList

Syntax: public ImportedFiles getImportedFileList(int data-Source, java.util.Calendar startDate, java.util.Calendar endDate, java.util.HashMap extra) throws DCException Description: Gets the list of files that were imported within the given time range. The data consolidator consolidates account data from various sources. The data consolidator schema also stores the data source and names of the files. This function retrieves the list of files that were imported in a given time range, specified by start and end dates. If the start date and end date are not specified, all files are returned. If a start date is not specified, all files up to the end date are returned.

API: getDependentFiles

Syntax: public ImportedFiles getDependent-Files(ImportedFile file, java.util.HashMap extra) throws DCException Description: Get the list of files that are dependent on a given file. The files that are imported after the given file create a possible dependency chain. The data consolidator provides a paging mechanism to simplify viewing large numbers of transactions. In order to achieve effective paging, the Data consolidator keeps the transaction index associated with each transaction per account and per type of information. The index must be in a certain order to achieve this. If an error is detected in a loaded file and the file needs to be unloaded, one must unload all the files that depend on the file to be unloaded. The function will identify dependent files and return files that have dependencies on the specified file.

API: undoFile

Syntax: public undoFile(ImportedFile file, ImportedFiles dependentFiles, java.util.HashMap extra) throws DCException Description: Removes all the data that was loaded as part of a given file and all the dependent files as well. See also getDependentFiles, above.

Data Consolidator Adapter

As described above, the data consolidator adapter contains the logic to store and retrieve information from a database repository. For any method that modifies the data consolidator repository, a database connection must be passed into the method. This allows multiple modification methods to be called as part of a single transaction. The methods getDBConnection and releaseDBConnection are used to retrieve a database connection for use with modification methods, and to release the connection once done, respectively. A typical transaction using the DCAdapter APIs might look like the following:

1: Connection connection;
2: Connection=DCAdapter.getConnection( );
3: DCAdapter.addAccounts( . . . , connection);
4: DCAdapter.addTransactions( . . . , connection);
5: DCAdapter.commit(connection);
6: DCAdapter.releaseConnection(connection);

The data consolidator adapter (DCAdapter) conforms to the following interface:

```
1: package com.ffusion.dataconsolidator.adapter;
2: public class DCAdapter {
3: /**
4: Method for initial configuration. This method initializes the Data
Consolidator. This
5: must be called before any other Data Consolidator methods.
6: */
7: public static void initialize( HashMap settings )
8: throws DCException
```

Database Operations

```
1: /**
2:    Retrieves a database connection object from the pool.
3:    @returns: a Connection for use with other DC Adapter methods
4: */
5: public static Connection getDBConnection()
6:    throws DCException
7:
8: /**
9:    Returns a database connection object to the pool.
10:     @param connection: database connection object
11: */
12: public static void releaseDBConnection( Connection connection )
13:    throws DCException
14:
15: /**
16:    Commit changes made to the database.
17:     @param connection: database connection object
18: */
19: public static void commit( Connection connection )
20:    throws DCException
21:
22: /**
23:    Rollback changes made to the database.
24:     @param connection: database connection object
25: */
26: public static void rollback( Connection connection )
27:    throws DCException
```

Cleanup Operations

```
1: /**
2:    Removes all information in the database older than the specified
age in days
3:    @param type: type of information to clean up
4:    @param ageInDays: age in days of the information to clean up
5: */
6: public static void cleanup( String type, int ageInDays, Hashmap extra )
7:    throws DCException
8:
9: /**
10:    Removes all information from a particular data source
11:     @param dataSource: the source of the data (for example, 1=live,
2=BAI)
12:    @param connection: database connection object
13: */
14: public static void cleanupDataSource( int dataSource, Connection
connection, Hashmap extra )
15:    throws DCException
16:
17: /*
18: Removes all information from a particular BAI file
19: @param BAIFileIdentifier: the BAI filename
20: @param connection: database connection object
21: @param extra: HashMap containing information (may be null)
22: */
23: public static void cleanupBAIFileIdentifier( String
BAIFileIdentifier, Connection connection, HashMap extra )
24:    throws DCException
```

Operations on Accounts

```
 1: /**
 2:    Adds an account to the repository.
 3:    @param account: account to be added
 4:    @param connection: database connection object
 5: */
 6: public static void addAccount( com.ffusion.beans.accounts.Account account,
 7:              Connection connection, Hashmap extra )
 8:    throws DCException
 9:
10: /**
11:    Checks if an account exists in the repository
12:    @param account: account to check for existence
13:    @param connection: database connection object
14:    @return: true if the account exists, and false otherwise
15: */
16:    public static boolean accountExists( com.ffusion.beans.accounts.Account account,
17:              Connection connection, Hashmap extra )
18:    throws DCException
19:
20: /**
21:    Retrieve account information for a specified account
22:    @param account: account to retrieve
23: @return a fully populated Account bean for the account
24: */
25: public static com.ffusion.beans.accounts.Account getAccount(
26:              com.ffusion.beans.accounts.Account account,
27:              Hashmap extra )
28:    throws DCException
29:
30: /**
31:    Updates an account in the repository.
32:    @param account: the account to be updated
33:    @param connection: database connection object
34: */
35: public static void updateAccount( com.ffusion.beans.accounts.Account account,
36:              Connection connection, Hashmap extra )
37:    throws DCException
38:
39: /**
40:    Deletes an account from the repository
41:    @param account: the account to be updated
42:    @param connection: database connection object
43: */
44: public static void deleteAccount( com.ffusion.beans.accounts.Account account,
45:              Connection connection,
46:              Hashmap extra )
47:    throws DCException
```

Operations on Transactions

```
 1: /**
 2:    Adds transactions into the repository for a specified account
 3:    @param account: the account for which we want to add the transactions
 4:    @param trans: a list of Transaction objects to be added
 5:    @param dataSource: the source of the data
 6:    @param connection: Database connection object
 7: */
 8: public static void addTransactions(
com.ffusion.beans.accounts.Account account,
 9:              com.ffusion.beans.banking.Transactions trans,
10:              int dataSource,
11:              Connection connection, Hashmap extra )
12:    throws DCException
13:
14: /**
15:    Retrieves a list of transactions for a specified account between
16:    a start dateto an end date
17:    @param account: the account for which we want to retrieve transactions
18:    @param startDate: the start date of transactions to get or null for no start date
19:    @param endDate: the end date of transactions to get or null for no end date
20:    @return: a list of Transaction beans
21: */
22: public static com.ffusion.beans.banking.Transactions getTransactions(
23:              com.ffusion.beans.accounts.Account account,
24:              Calendar startDate,
25:              Calendar endDate,
26:              Hashmap extra )
27:    throws DCException
28:
29: /**
30:    Retrieves a list of transactions for a specified account between
a start date
31: to an end date, to a maximum of PAGESIZE of them
32:    @param account: the account for which we want to retrieve transactions
33:    @param startDate: the start date of transactions to get or null
for no start date
34:    @param endDate: the end date of transactions to get or null for
no end date
35:    @return: a list of Transaction beans
36: */
37: public static com.ffusion.beans.banking.Transactions getPagedTransactions(
38:              com.ffusion.beans.accounts.Account account,
39:              Calendar startDate,
40:              Calendar endDate,
41:              Hashmap extra )
42:    throws DCException
43:
44: /**
45:    Retrieves the most recent transactions for the specified account
46:    @param account: the account for which we want to retrieve the transactions
47:    @return: a list of Transaction beans containing the transactions
48:        (at most PAGESIZE of them)
49: */
50: public static com.ffusion.beans.banking.Transactions getRecentTransactions(
51:              com.ffusion.beans.accounts.Account account,
52:              Hashmap extra )
53:    throws DCException
54:
55: /**
56:    Retrieves the next batch of PAGESIZE transactions for the specified account
57:    @param account: the account for which we want to retrieve the transactions
58:    @param nextIndex: the next index of information to retrieve
59:    @return: a list of Transaction beans containing the transactions (at most
60:        PAGE_SIZE of them)
61: */
62: public static com.ffusion.beans.banking.Transactions
```

-continued

```
getNextTransactions(
63:             com.ffusion.beans.accounts.Account
account,
64:             long nextIndex,
65:             Hashmap extra )
66:    throws DCException
67:
68: /**
69:    Retrieves the previous batch of PAGESIZE transactions
for the
specified account
70:    @param account: the account for which we want to retrieve
the
transactions
71:    @param lastIndex: the last index of information to retrieve
72:    @return: a list of Transaction beans containing the transactions
73:       (at most PAGE_SIZE of them)
74: */
75: public static com.ffusion.beans.banking.Transactions
getPreviousTransactions(
76:             com.ffusion.beans.accounts.Account
account,
77:             long lastIndex,
78:             Hashmap extra )
79:    throws DCException
80:
81: /**
82:    Gets the number of Transactions for a specified account
between
83:    a range of calendar dates.
84:    @param account: the account for which information is
being
requested
85: @param start The starting date of information to retrieve,
or null
if no start date
86: @param end The end date of information to retrieve, or
null if no
end date
87: @param extra Additional information
88: */
89: public int getNumTransactions( com.ffusion.beans.accounts.
Account
account,
90: Calendar start,
91: Calendar end,
92: Hashmap extra )
93: throws DCException;
94:
95: /*
96: Retrieves a list of transactions for a specified
FixedDepositInstrument
between a start date to an end date
97: @param fdi: the instrument for which we want to retrieve
transactions
98: @param startDate: the start date of transactions to get
or null for
no start date
99: @param endDate: the end date of transactions to get
or null for no
end date
100: @return: a list of Transaction beans
101: */
102: public static com.ffusion.beans.banking.Transactions
getFDITransactions(
103: com.ffusion.beans.accounts.FixedDepositInstrument
fdi,
104: Calendar startDate,
105: Calendar endDate,
106: HashMap extra )
107: throws DCException
```

Operations on Account Summary Information

```
1: /**
2:    Adds summary information into the repository for a specified
account
3:    @param account: the account for which summary information
has
been supplied
4:    @param info: the summary information to be added
5:    @param dataSource: the source of the data
6:    @param connection: Database connection object
7: */
8: public static void addSummary( com.ffusion.beans.accounts.
Account
account,
9:             com.ffusion.beans.accounts.AccountSummary
info,
10:             int dataSource,
11:             Connection connection, Hashmap extra )
12:    throws DCException
13:
14:  /**
15:    Retrieve the summary information for a specified account
within a
date range
16:    @param account: the account for which we want the
summary
17:    @param start: the starting date of information to retrieve
or
null if no start date
18:    @param end: the end date of information to retrieve
or null if no
end date
19: */
20: public static com.ffusion.beans.accounts.AccountSummaries
getSummary(
21:             com.ffusion.beans.accounts.Account
account )
22:             Calendar start, Calendar end,
23:             Hashmap extra )
24:    throws DCException
25:
26: /**
27:    Adds extended summary information into the repository
for a
specified account
28:    @param account: the account for which summary information
has
been supplied
29:    @param info: the summary information to be added
30:    @param dataSource: the source of the data
31:    @param connection: Database connection object
32: */
33: public static void addExtendedSummary(
com.ffusion.beans.accounts.Account account,
34:             com.ffusion.beans.accounts.ExtendedAccountSummary
info,
35:             int dataSource,
36:             Connection connection, Hashmap extra )
37:    throws DCException
38:
39: /**
40:    Retrieve the extended summary information for a specified
account
within a date range
41:    @param account: the account for which we want the
summary
42:    @param start: the starting date of information to retrieve
or
null if no start date
43:    @param end: the end date of information to retrieve
or null if
no end date
44: */
45: public static com.ffusion.beans.accounts.ExtendedAccountSummaries
getExtendedSummary(
46:             com.ffusion.beans.accounts.Account
account,
47:             Calendar start, Calendar end,
```

-continued

```
48:            Hashmap extra )
49:     throws DCException
```

Operations on Account History

```
1: /**
2: Record account history for a particular day
3:
4:     @param account: the account for which history is to be stored
5:     @param history: the account history information
6:     @param dataSource: the source of the data
7:     @param connection: the database connection
8:
9: */
10: public static void addHistory( com.ffusion.beans.account.Account,
11:             com.ffusion.beans.account.AccountHistory history,
12:             int dataSource,
13:             Connection connection,
14:             Hashmap extra )
15:     throws DCException
16:
17: /**
18:     Retrieve a list of account history information within a specified
date range
19:
20:     @param account: the account for which history is to be retrieved
21:     @param start: the starting date of information to retrieve or
null if no start date
22:     @param end: the end date of transactions to retrieve or null if
no end date
23:
24:     @return: a list of AccountHistory beans
25: */
26: public static AccountHistories getHistory(
com.ffusion.beans.accounts.Account account,
27:             Calendar start, Calendar end,
28:             Hashmap extra )
29:     throws DCException
```

Operations on Lockbox Summaries

```
1: /**
2:     Adds summary information into the repository for a specified
lockbox
3:     @param summary: the summary information to be added
4:     @param dataSource: the source of the data
5:     @param connection: database connection object
6: */
7: public static void addLockboxSummary(
8: com.ffusion.beans.lockbox.LockboxSummary summary,
9:             int dataSource,
10:            Connection connection,
11:            Hashmap extra )
12:     throws DCException
13:
14: /**
15:     Retrieve the summary information for a specified lockbox for
a date range
16:     @param lockbox: the lockbox for which we want the summaries
17:     @param startDate: the start date of summaries to get or null if
no end date
18:     @param endDate: the end date of summaries to get
```

-continued

```
or null if no
end date
19: */
20: public static LockboxSummaries getLockboxSummaries(
21: com.ffusion.beans.lockbox.LockboxAccount lockbox,
22:             Calendar startDate, Calendar endDate,
23:             Hashmap extra )
24:     throws DCException
```

Operations on Lockbox Transactions

```
1: /**
2:     Adds transactions into the repository for a specified lockbox
3:     @param lockbox: the lockbox for which we information has been
supplied
4:     @param trans: a list of LockboxTransaction objects to be added
5:     @param dataSource: the source of the data
6:     @param connection: Database connection object
7: */
8: public static void addLockboxTransactions(
9:             com.ffusion.beans.lockbox.LockboxAccount lockbox,
10:            com.ffusion.beans.lockbox.LockboxTransactions trans,
11:            int dataSource,
12:            Connection connection, Hashmap extra )
13:     throws DCException
14:
15: /**
16:     Retrieves a list of transactions for a specified lockbox between a
17:     start date to an end date
18:     @param lockbox: the lockbox for which we want the transactions
19:     @param startDate: the start date of transactions to get or null
if no start date
20:     @param endDate: the end date of transactions to get or null if no
end date
21:     @return: a list of LockboxTransaction beans
22: */
23: public static com.ffusion.beans.lockbox.LockboxTransactions
getLockboxTransactions(
24:             com.ffusion.beans.lockbox.LockboxAccount lockbox,
25:             Calendar startDate,
26:             Calendar end Date,
27:             Hashmap extra )
28:     throws DCException
29:
30: /**
31:     Retrieves a list of transactions for a specified lockbox between a
32: start date to an end date, to a maximum of PAGESIZE of them
33:     @param lockbox: the lockbox for which we want the transactions
34:     @param startDate: the start date of transactions to get or null
if no start date
35:     @param endDate: the end date of transactions to get
  or null if no
end date
36:     @return: a list of LockboxTransaction beans
37: */
38: public static com.ffusion.beans.lockbox.LockboxTransactions
39: getPagedLockboxTransactions(
40:             com.ffusion.beans.lockbox.LockboxAccount lockbox,
```

```
41:                 Calendar startDate,
42:                 Calendar endDate,
43:                 Hashmap extra )
44:     throws DCException
45:
46: /**
47:     Retrieves the most recent transactions for the specified
lockbox
48:     @param lockbox: the lockbox for which we want the
transactions
49:     @return: a list of LockboxTransaction beans containing
the
50:         transactions (at most PAGESIZE of them)
51: */
52: public static com.ffusion.beans.lockbox.LockboxTransactions
getRecentLockboxTransactions(
53:                 com.ffusion.beans.lockbox.LockboxAccount
lockbox,
54:                 Hashmap extra )
55:     throws DCException
56:
57: /**
58: Retrieves the next batch of PAGESIZE transactions for the
specified
lockbox
59:     @param lockbox: the lockbox for which we want the
transactions
60:     @param nextIndex: the next index of information to
retrieve
61:     @return: a list of LockboxTransaction beans containing
the
62:         transactions (at most PAGE_SIZE of them)
63: */
64: public static com.ffusion.beans.lockbox.LockboxTransactions
getNextLockboxTransactions(
65:                 com.ffusion.beans.lockbox.LockboxAccount
lockbox,
66:                 long nextIndex,
67:                 Hashmap extra )
68:     throws DCException
69:
70: /**
71:     Retrieves the previous batch of PAGESIZE transactions
for the
72: specified lockbox
73:     @param lockbox: the lockbox for which we want to retrieve
transactions
74:     @param lastIndex: the last index of information to retrieve
75:     @return: a list of LockboxTransaction beans containing
the
transactions (at
76: most PAGE_SIZE of them)
77: */
78: public static com.ffusion.beans.lockbox.LockboxTransactions
getPreviousLockboxTransactions(
79:                 com.ffusion.beans.lockbox.LockboxAccount
lockbox,
80:                 long lastIndex,
81:                 Hashmap extra )
82:     throws DCException
```

Operations on Lockbox Credit Items

```
1:     /**
2:         Adds credit items into the repository for a specified lo
        ckbox
3:         @param lockbox: the lockbox for which we informatio
        n has been
        supplied
4:         @param items: a list of LockboxCreditItem objects to
        be added
5:         @param dataSource: the source of the data
6:         @param connection: Database connection object
7:     */
8:     public static void addLockboxCreditItems(
9:                 com.ffusion.beans.lockbox.LockboxAccou
nt
lockbox,
10:                 com.ffusion.beans.lockbox.LockboxCred
itItems
items,
11:                 int dataSource,
12:                 Connection connection, Hashmap extra )
13:     throws DCException
14:
15: /**
16:     Retrieves a list of credit items for a specified lockbox
between a
17: start date to an end date
18:     @param lockbox: the lockbox for which we want to r
etrieve credit
items
19:     @param startDate: the start date of items to get or n
ull for no
start date
20:     @param endDate: the end date of items to get or null
for no end
date
21:     @return: a list of LockboxCreditItem beans
22: */
23: public static com.ffusion.beans.lockbox.LockboxCredi
tItems
getLockboxCreditItems(
24:                 com.ffusion.beans.lockbox.LockboxAcco
unt
lockbox,
25:                 Calendar startDate,
26:                 Calendar endDate,
27:                 Hashmap extra )
28:     throws DCException
29:
30: /**
31:     Retrieves a list of credit items for a specified lockbox
between a
32: start date to an end date, to a maximum of PAGESIZE
of them
33:     @param lockbox: the lockbox for which we want to r
etrieve credit
items
34:     @param startDate: the start date of items to get or n
ull for no
start date
35:     @param endDate: the end date of items to get or null
for no end
date
36:     @return: a list of LockboxCreditItem beans
37: */
38: public static com.ffusion.beans.lockbox.LockboxCredi
tItems
getPagedLockboxCreditItems(
39:                 com.ffusion.beans.lockbox.LockboxAcco
unt
lockbox,
40:                 Calendar startDate,
41:                 Calendar endDate,
42:                 Hashmap extra )
43:     throws DCException
44:
45: /**
46:     Retrieves the most recent credit items for the specifi
ed lockbox
47:     @param lockbox: the lockbox for which we want to r
etrieve credit
items
48:     @return: a list of LockboxCreditItem beans containin
g the items
49:         at most PAGESIZE of them)
50: */
51: public static com.ffusion.beans.lockbox.LockboxCredi
tItems
getRecentLockboxCreditItems(
52:                 com.ffusion.beans.lockbox.LockboxAcco
unt
lockbox,
```

-continued

```
53:                    Hashmap extra )
54:            throws DCException
55:
56:    /**
57:    Retrieves the next batch of PAGESIZE credit items for t
       he specified
       lockbox
58:            @param lockbox: the lockbox for which we want the
       credit items
59:            @param nextIndex: the next index of information to
       retrieve
60:            @return: a list of LockboxCreditItem beans containin
       g the items
61:    (at most PAGE_SIZE of them)
62:    */
63:    public static com.ffusion.beans.lockbox.LockboxCredi
       tItems
       getNextLockboxCreditItems(
64:                    com.ffusion.beans.lockbox.LockboxAcco
       unt
       lockbox,
65:                    long nextIndex,
66:                    Hashmap extra )
67:            throws DCException
68:
69:    /**
70:            Retrieves the previous batch of PAGESIZE credit items
       for the
71:    specified lockbox
72:            @param lockbox: the lockbox for which we want to r
       etrieve credit
       items
73:            @param lastIndex: the last index of information to re
       trieve
74:            @return: a list of LockboxCreditItem beans containin
       g the items
75:    at most PAGE_SIZE of them)
76:    */
77:    public static com.ffusion.beans.lockbox.LockboxCredi
       tItems
       getPreviousLockboxCreditItems(
78:                    com.ffusion.beans.lockbox.LockboxAcco
       unt
       lockbox,
79:                    long lastIndex,
80:                    Hashmap extra )
81:            throws DCException
```

Operations on Disbursement Summaries

```
 1:    /**
 2:            Adds disbursement summary information into the rep
       ository for a
       specified account
 3:            @param summary: the summary information to be ad
       ded
 4:            @param dataSource: the source of the data
 5:            @param connection: database connection object
 6:    */
 7:    public static void addDisbursementSummary(
 8:
       com.ffusion.beans.disbursement.DisbursementSummary s
       ummary,
 9:                    int dataSource,
10:                    Connection connection,
11:                    Hashmap extra )
12:            throws DCException
13:
14:    /**
15:            Retrieve the summary information for a specified dis
       bursement for
       a date range
16:            @param account: the disbursement for which we wan
       t the summaries
```

-continued

```
17:            @param startDate: the start date of summaries to get
       or null if
       no start date
18:            @param endDate: the end date of summaries to get
       or null if no
       start date
19:    */
20:    public static DisbursementSummaries getDisbursemen
       tSummaries(
21:
       com.ffusion.beans.disbursement.DisbursementAccount ac
       count,
22:                    Calendar startDate, Calendar endDa
       te,
23:                    Hashmap extra )
24:            throws DCException
```

Operations on Disbursement Transactions

```
 1:    /**
 2:            Adds transactions into the repository for a specified
       disbursement account
 3:            @param account: the account for which we want to ad
       d the
       transactions
 4:            @param trans: a list of DisbursementTransaction obje
       cts to be
       added
 5:            @param dataSource: the source of the data
 6:            @param connection: Database connection object
 7:    */
 8:    public static void addDisbursementTransactions(
 9:
       com.ffusion.beans.disbursement.DisbursementAccount ac
       count,
10:
       com.ffusion.beans.disbursement.DisbursementTransactio
       ns trans,
11:                    int dataSource,
12:                    Connection connection, Hashmap extra )
13:            throws DCException
14:
15:    /**
16:            Retrieves a list of transactions for a specified disburs
       ement
       account between a
17:    start date to an end date
18:            @param account: the disbursement account for whic
       h we want to
       retrieve transactions
19:            @param startDate: the start date of transactions to g
       et or null
       if no start date
20:            @param endDate: the end date of transactions to get
       or null if no
       end date
21:            @return: a list of DisbursementTransaction beans
22:    */
23:    public static
       com.ffusion.beans.disbursement.DisbursementTransactio
       ns
       getDisbursementTransactions(
24:
       com.ffusion.beans.disbursement.DisbursementAccount ac
       count,
25:                    Calendar startDate,
26:                    Calendar endDate,
27:                    Hashmap extra )
28:            throws DCException
29:
30:    /**
31:            Retrieves a list of transactions for a specified disburs
       ement
       account between a
```

```
32:     start date to an end date, to a maximum of PAGESIZE
        of them
33:        @param account: the disbursement account for whic
        h we want to
        retrieve transactions
34:        @param startDate: the start date of transactions to g
        et or null
        if no start date
35:        @param endDate: the end date of transactions to get
        or null if no
        end date
36:        @return: a list of DisbursementTransaction beans
37:     */
38:     public static
        com.ffusion.beans.disbursement.DisbursementTransactio
        ns
39:     getPagedDisbursementTransactions(
40:
        com.ffusion.beans.disbursement.DisbursementAccount ac
        count,
41:            Calendar startDate,
42:            Calendar endDate,
43:            Hashmap extra )
44:        throws DCException
45:
46:     /**
47:        Retrieves the most recent transactions for the specifi
        ed
        disbursement account
48:        @param account: the disbursement account for whic
        h we want to
        retrieve transactions
49:        @return: a list of DisbursementTransaction beans co
        ntaining the
50:            transactions (at most PAGESIZE of them)
51:     */
52:     public static
        com.ffusion.beans.disbursement.DisbursementTransactio
        ns
        getRecentDisbursementTransactions(
53:
        com.ffusion.beans.disbursement.DisbursementAccount ac
        count,
54:            Hashmap extra )
55:        throws DCException
56:
57:     /**
58:        Retrieves the next batch of PAGESIZE transactions for
        the
59:     specified disbursement account
60:        @param account: the disbursement account for whic
        h we want to
        retrieve transactions
61:        @param nextIndex: the next index of information to
        retrieve
62:        @return: a list of DisbursementTransaction beans co
        ntaining the
        transactions (at
63:     most PAGE_SIZE of them)
64:     */
65:     public static
        com.ffusion.beans.disbursement.DisbursementTransactio
        ns
        getNextDisbursementTransactions(
66:
        com.ffusion.beans.disbursement.DisbursementAccount ac
        count,
67:            long nextIndex,
68:            Hashmap extra )
69:        throws DCException
70:
71:     /**
72:        Retrieves the previous batch of PAGESIZE transaction
        s for the
        specified
73:     disbursement account
74:        @param account: the disbursement account for whic
        h we want to
        retrieve transactions
75:        @param lastIndex: the last index of information to re
        trieve
76:        @return: a list of DisbursementTransaction beans co
        ntaining the
77:     transactions (at most PAGE_SIZE of them)
78:     */
79:     public static
        com.ffusion.beans.disbursement.DisbursementTransactio
        ns
        getPreviousDisbursementTransactions(
80:
        com.ffusion.beans.disbursement.DisbursementAccount ac
        count,
81:            long lastIndex,
82:            Hashmap extra )
83:        throws DCException
```

Reporting

```
1:      /**
2:         Get the data for a specified account report.
3:         @param criteria: the criteria of the report
4:      */
5:      public IReportResult getAccountReportData( ReportCrite
        ria criteria,
6:             HashMap extra )
7:      throws DCException
8:
9:      /**
10:        Get the data for a specified disbursement report.
11:        @param criteria: the criteria of the report
12:     */
13:     public IReportResult getDisbursementReportData( Rep
        ortCriteria
        criteria,
14:            HashMap extra )
15:     throws DCException
16:
17:     /**
18:        Get the data for a specified lockbox report.
19:        @param criteria: the criteria of the report
20:     */
21:     public IReportResult getLockboxReportData( ReportCri
        teria criteria,
22:            HashMap extra )
23:     throws DCException
24:     }
```

Operations on Fixed Deposit Instruments

```
1:      /**
2:      Adds an instrument into the repository
3:         @param incomingInstrument: the instrument that we w
        ant to add
4:         @param dataSource: the source of the data
5:         @param connection: Database connection object
6:      */
7:
8:      public static void addFixedDepositInstrument(
9:         com.ffusion.beans.accounts.FixedDepositInstrument
        incomingInstrument,
10:        int dataSource,
11:        Connection connection,
12:        HashMap extra)
13:     throws DCException
14:
15:
16:     /**
17:        Retrieves a list of instruments for a account between
        a start
        date and an end date
```

-continued

```
18:         @param account: the account for which we want to r
            etrieve
            instruments
19:         @param startDate: the start date of transactions to g
            et or null
            if no start date
20:         @param endDate: the end date of transactions to get
            or null if no
            end date
21:         @return: a list of FixedDepositInstrument beans
22:     */
23:
24:     public static FixedDepositInstruments getFixedDeposit
            Instruments(
25:         com.ffusion.beans.accounts.Account account,
26:         Calendar startDate,
27:         Calendar endDate,
28:         HashMap extra )
29:     throws DCException
```

File Adapter

The file adapter parses data files and stores the contents into the data consolidator. For example, a BAI file adapter parses BAI files and stores the contents into the data consolidator. The following discussion describes a BAI file adapter provided in the currently preferred embodiment, which is provided as a Java class that conforms to an IFileAdapter interface. The current version of the BAI file adapter will support group status codes (found in the 02 Group Header Record) of 1=Update only.

The public interface of the file adapter is as follows:

```
1:      public interface IFileAdapter {
2:
3:      /**
4:          Initializes the File Adapter
5:          @param initialize: any settings required for initializat
            ion
6:      */
7:      public void initialize( Hash Map initialize )
8:      throws FIException;
9:
10:     /**
11:         Obtain any resources that are required prior to invo
            king
            processFiles
12:     */
13:     public void open( Hashmap extra )
14:     throws FIException;
15:
16:     /**
17:         Release any resources acquired by a call to open
18:     */
19:     public void close( Hashmap extra )
20:     throws FIException;
21:
22:     /**
23:         Imports (and processes) the file specified by 'is'
24:         @param is: an Input Stream for the file to be importe
            d
25:     */
26:     public void processFile( InputStream is, Hashmap extr
            a)
27:     throws FIException;
28:     }
```

The initialize method would be called only once by the File Importer Handler initialization. The open, close, and processFile methods would be called repeatedly. For example, to process a single file, the code would invoke:

open( . . . )
processFile( . . . )
close( . . . )

To process multiple files, the code would invoke:

open( . . . )
for each file {processFile( . . . )}
close( . . . )

The following will briefly describe each of the methods included in the file adapter API:

API: initialize
Syntax: public void initialize(HashMap initialize) throws FIException
Description: Initializes the file adapter so that it is ready for use.

API: open
Syntax: public void open(Hashmap extra) throws FIException
Description: Prepare the adapter for a series of (possibly one) calls to processFile.

API: close
Syntax: public void close(Hashmap extra) throws FIException
Description: Releases the resources obtained by a previous call to open.

API: processFile
Syntax: public void processFile(InputStream is, Hashmap extra) throws FIException
Description: Validate and process one BAI file. The file to be processed is passed as an InputStream. The file contents are broken apart and stored in the data consolidator.

Semantics:

1. Call DCAdapter.getDBConnection to get a database connection from the DCAdapter pool.

2. Begin reading the BAI file. The file is processed as it is read. The file is not read in one chunk into memory since it can be large.

3. For each Account Header found, determine if the account requires consolidation. Consolidation occurs only for accounts known to the profile database (i.e. registered for online services with the Corporate Banking Solution). If the account does not require consolidation, then skip all fields until the end of the Account Trailer.

4. If the account requires consolidation, read the records and extract status, summary, and detail information into the appropriate tables.

5. Repeat steps 3-8 for each Group found in the BAI File.

6. If the file is parsed completely without errors, use DCAdapter.commit to commit the BAI file information to the Data Consolidator.

7. Release the DB Connection by calling DCAdapter.releaseConnection.

8. If an error occurred, use DCAdapter.rollback to rollback the information and throw the Exception.

Exceptions (Core API Exceptions, DCExceptions and FIExceptions): For all exceptions thrown from within the data consolidator service there is a DCException class. All errors that are thrown from the service have an error code defined within the class. These exceptions are caught by the Core API logic and wrapped in an exception with an appropriate error code. The BAI file adapter throws FIExceptions.

Logging: The data consolidator uses the Java Logging API (in the javax.util.logging package) to log information during program execution.

File Importer

The file importer is a file processor which locates and processes financial institution-supplied files that are already resident in the file system (for example, BAI files and Positive Pay Issues files). Each file type is handled by a file adapter. The file importer is a pluggable architecture in that it can be extended to support additional file types, including proprietary file types. The role of the file importer in the processing of files is described below.

At scheduled times, the alerts engine (or scheduler) will fire alerts to process financial institution-supplied files.

Alerts can be set to process different file types at different times. When the alert fires, a delivery channel registered with the alerts engine is invoked. Control passes to the processFiles method in the file importer service (public void processFiles(String fileType, HashMap extra) throws FIException).

The file type for scheduled processing may include BAI and Positive Pay Issues files. The file type for on-demand processing may include SWIFT BIC Directory, SWIFT BIC Directory Update, and Federal Reserve Directory Update files. The processing that takes place will be dependent on the file type. For example, BAI files are imported into the data consolidator. Positive Pay Issues files are imported into the Positive Pay database.

A file importer service creates and initializes the various file processing adapters and maintains the mapping from file type to adapter instance. The service is also responsible for placing uploaded files into the file system and managing error and archive directories. The file importer service requires several pieces of information for configuration. See Configuration (fileimporter.xml), below, for detailed information.

The file importer service API provides the entry points for retrieving a list of supported file types that can be uploaded; uploading and processing of a client-uploaded file (invoked by the Corporate Banking Solution); scheduled processing of financial institution supplied files of a specified type (invoked by an Alerts Delivery Channel); cleanup of client-uploaded or financial institution supplied files (invoked by an alerts delivery channel); and on-demand processing of files of a specified type (set up using Business Central). The file importer service does not need to be customized in order to support new file types.

The following illustrates the interface of the file importer:

```
1:   public interface FileImporter {
2:   /**
3:       Initializes the File Importer
4:   */
5:   public void initialize( HashMap settings )
6:       throws FIException
7:
8:   /**
9:       Get the list of file types the user can upload.
10:      @param user: the SecureUser requesting to upload
11:  */
12:  public ArrayList getUploadFileTypes(
     com.ffusion.beans.SecureUser user,
13:                 Hashmap extra )
14:  throws FIException
15:
16:  /**
17:      Uploads and processes a file.
18:      @param user: the SecureUser requesting to upload
19:      @param file: the file contents uploaded in byte array
         format
20:      @parm fileType: the type of file to upload
21:      @parm fileName: the name of the file
22:  */
23:  public void upload( com.ffusion.beans.SecureUser user,
         byte[] file,
24:            String fileType, String filename,
25:            Hashmap extra )
```

-continued

```
26:      throws FIException
27:
28:  /**
29:        Processes (on a schedule) the contents of files of the
         specified type.
30:      @param fileType: the type of files to process
31:  */
32:  public void processFiles( String fileType,
33:                 Hashmap extra )
34:      throws FIException
35:
36:  /**
37:        Removes files (on a schedule) that are considered stale.
38:      @param fileType: the type of files that is to be cleaned up
39:      @param status: the status of the files to be cleaned up
40:      @param ageInDays: age of the files to be cleaned up
41:  */
42:  public void cleanup( String fileType, String status, int
     ageInDays,
43:                 Hashmap extra )
44:      throws FIException
45:  }
```

The following will briefly describe the methods of the file importer service API:

API: initialize

Syntax: public void initializes throws FIException

Description: Initialize the file importer. This method is invoked during initialization and reads configuration information from the fileimporter.xml file. Initialization is completed prior to any other file importer method being called.

API: getUploadFileTypes

Syntax: public static ArrayList getUploadFileTypes(com.ffusion.beans.SecureUser user, Hashmap extra) throws FIException Description: Build a list of file types (Strings) that can be uploaded. The system will automatically filter out file types for which the user does not have permission.

API: upload

Syntax: public void upload(com.ffusion.beans.SecureUser user, byte[ ] file, String fileType, String filename,Hashmap extra) throws FIException;

Parameters: user: the SecureUser requesting file upload; file: the file contents uploaded in byte array format; fileType: the type of file to upload; fileName: the name of the file; and extra: any additional information for custom implementations.

Description: Take the contents of a file (in a byte array) and store the data into the file system. Based on the specified file type, the appropriate file adapter is called to process the file. Valid file types are listed in the configuration file. The uploaded file is given a unique name in the following format and placed in the process directory configured for that file type:

<USER_NAME>-<DATE>-<TIME>-<FILE_NAME> where: USER_NAME is the name of the user as specified in the com.ffusion.beans.SecureUser object supplied in the user parameter (any characters that are not valid for a file name are replaced by an underscore); DATE is the date the file was imported, in the format YYYYMMDD; TIME is the time the file was imported, in the format HHMMSS; and FILE_NAME is the name of the file as specified in the fileName parameter.

For example, suppose the user tbowman uploads three ACH files called "myfile1.txt", "myfile2.txt", and "myfile2.txt". Three files will get written (by three separate calls to upload) with the following names:

tbowman-20020722-080042-myfile1.txt
tbowman-20020722-123022-myfile2.txt
tbowman-20020722-154516-myfile2.txt The open, processing, and close methods are then invoked in sequence on the file adapter. If processing is successful, the file is moved to the archive directory. Otherwise, the error information is stored in the error directory. If the file was copied to the "error" directory, a text file containing details of the error is also written to the "error" directory. The file has the same name as the moved file, but with extension ".err". The format of this file is currently as follows:

Line 1: Date and time of processing (when the error occurred).

Line 2-n: the exception, including stack trace, that caused processing to abort.

API: processFiles

Syntax: public void processFiles(String fileType, Hashmap extra) throws FIException Parameters: filetype: the type of files to process; and extra: any additional information for custom implementations.

Description: This routine is invoked on a schedule-driven or on-demand basis, to process files of the specified type residing in the file system. The type of processing depends on the file type. The file adapter "open" method is invoked. For each file in the process directory (or a subdirectory thereof), the file is read and the contents of the file are passed to the processFiles method of the file adapter. The "close" method of the file adapter is then called. Successfully processed files are moved to the archive directory. Unsuccessfully processed files are copied to the error directory.

As files are moved into the "archive" or copied into the "error" directory, the subdirectory structure will be preserved in the destination directory and subdirectories will be created as needed. For example, if PROCESS_DIR/foo/bar/baz/SomeFileName.BAI is processed successfully, it will be moved to the ARCHIVE_DIR/foo/bar/baz directory. When a file is moved, the file will be renamed using the following convention:

<ORIGINAL_FILENAME>-<DATE>-<TIME>.<ORIGINAL_FILE_EXT> where: ORIGINAL_FILENAME is the stem of the original file name (file name without the extension); DATE is the date the original file was created, in the format YYYYMMDD; TIME is the time the original file was created, in the format HHMMSS; and ORIGINAL_FILE_EXT is the extension of the original file. If the file was copied to the "error" directory, then a text file containing details of the error is also written to the "error" directory. The file has the same name as the moved file, but with the extension ".err".

API: cleanup

Syntax: public void cleanup(String fileType, String status, int ageInDays, Hashmap extra) throws FIException Parameters: fileType: the type of files to be cleaned up; status: the status of the files to be cleaned up (process, archive, or error); and ageInDays: age of the files to be cleaned up.

Description: Remove files that are considered to be stale (process, error. or archived files). Directories are cleaned up recursively.

Configuring the File Importer Service

The file importer service uses several pieces of information for its configuration. Specifically, it needs information to determine to which file adapter it should pass a file of a specific type. For each file adapter, the following information is required:

FileType—"ACH", "ACH Import", "BAI", "Positive Pay Check Record", "Positive Pay Issues", "Account Register Check Record", "Custom", and others ProcessDir—directory where files to be processed reside ArchiveDir—directory to which successfully processed files are moved ErrorDir—directory to which unsuccessfully processed files are copied (and to which error files written)

AdapterClass—the Java class that implements the file adapter for the file type (can be empty for files that are uploaded but do not need additional processing)

DisplayForUpload—show this file type as a type that can be uploaded by the client. The service will find this information in an XML configuration file called "fileimporter.xml". When the "initialize" method of the service is invoked, it will load the configuration file, parse it, and initialize the file adapters registered in the file.

In addition, each file adapter may require additional configuration information specific to that file adapter. For example, the Positive Pay Check Record file adapter requires the following Message Broker information: Message set;

Message name; DatabaseType; UseThinDriver; Machine name; Port number; Database name; User ID; and Password.

Properties specific to a file adapter are enclosed within ADAPTERSETTINGS. A portion of the fileimporter.xml file is shown below:

```
 1: <XML>
 2: <DB_PROPERTIES>
 3:     <DefaultConnections>1</DefaultConnections>
 4:     <MaxConnections>30</MaxConnections>
 5:     <User>db2inst1</User>
 6:     <Password>db2inst1</Password>
 7:     <PoolType>FFI</PoolType>
 8:     <ConnectionType>DB2:NET</ConnectionType>
 9:     <Server>cbdbserver</Server>
10:     <DBName>cbdb</DBName>
11:     <Port>6789</Port>
12: </DB_PROPERTIES>
13: <FILEADAPTER>
14:     <FILETYPE>ACH</FILETYPE>
15:     <ENTITLEMENTNAME>ACHBatch</ENTITLEMENTNAME>
16:     <PROCESSDIR>/usr/corporate/ach/process/</PROCESSDIR>
17:     <ARCHIVEDIR>/usr/corporate/ach/archive/</ARCHIVEDIR>
18:     <ERRORDIR>/usr/corporate/ach/error/</ERRORDIR>
19:     <ADAPTERCLASS>com.ffusion.fileimporter.fileadapters.ACHAdapter</ADAPTERCLASS>
20: 
21:     <DISPLAYFORUPLOAD>true</DISPLAYFORUPLOAD>
22:     <ADAPTERSETTINGS>
23:     </ADAPTERSETTINGS>
24: </FILEADAPTER>
25: <FILEADAPTER>
26:     <FILETYPE>BAI</FILETYPE>
27:     <PROCESSDIR>/usr/corporate/bai/process/</PROCESSDIR>
28:     <ARCHIVEDIR>/usr/corporate/bai/archive/</ARCHIVEDIR>
```

-continued

```
29:     <ERRORDIR>/usr/corporate/bai/error/</ERRORDIR
        >
30:     <ADAPTERCLASS>com.ffusion.fileimporter.fileadapte
        rs.BAIAdapter</
31: ADAPTERCLASS>
32:     <DISPLAYFORUPLOAD>false</DISPLAYFORUPLOAD>
33: </FILEADAPTER>
34: <FILEADAPTER>
35:     <FILETYPE>Positive Pay Check Record</FILETYPE>
36:     <ENTITLEMENTNAME>Positive Pay</ENTITLEMENTN
        AME>
37:     <PROCESSDIR>/usr/corporate/positivepaycheckreco
        rd/process/</
38: PROCESSDIR>
39:     <ARCHIVEDIR>/usr/corporate/positivepaycheckreco
        rd/archive/</
40: ARCHIVEDIR>
41:     <ERRORDIR>/usr/corporate/positivepaycheckrecord
        /error/</ERRORDIR>
```

The ACH file adapter is an example of a file type that can be uploaded by the client. The BAI file adapter is an example of a file type that is supplied by the financial institution and processed on a schedule. The Positive PayCheck Record file adapter is an example of a file adapter that has adapter specific properties (ADAPTERSETTINGS).

```
1:  <ADAPTERCLASS>com.ffusion.fileimporter.fileadapters.
    PPayCheckRecordFile
2:  Adapter</ADAPTERCLASS>
3:  <DISPLAYFORUPLOAD>true</DISPLAYFORUPLOAD>
4:      <ADAPTERSETTINGS>
5:          <MESSAGEBROKER>
6:              <MESSAGESET>PositivePayCheckRecord</MESSAGES
    ET>
7:              <MESSAGENAME>PositivePayCheckRecord</MESSAG
    ENAME>
8:              <DBTYPE>DB2:APP</DBTYPE>
9:              <USETHINDRIVER>true</USETHINDRIVER>
10:             <MACHINE>mbdbserver</MACHINE>
11:             <PORTNUM>8888</PORTNUM>
12:             <DBNAME>mbdemo</DBNAME>
13:             <USERID>mbdbuser</USERID>
14:             <PASSWORD>mbdbpasswd</PASSWORD>
15:         </MESSAGEBROKER>
16:     </ADAPTERSETTINGS>
17: </FILEADAPTER>
18: <FILEADAPTER>
19:     <FILETYPE>Custom</FILETYPE>
20:     <ENTITLEMENTNAME>Custom File Upload</ENTITLE
    MENTNAME>
21:     <PROCESSDIR>/usr/corporate/custom/process/</P
    ROCESSDIR>
22:     <ARCHIVEDIR>/usr/corporate/custom/archive/</AR
    CHIVEDIR>
23:     <ERRORDIR>/usr/corporate/custom/error/</ERROR
    DIR>
24:     <ADAPTERCLASS>com.ffusion.fileimporter.fileadapte
    rs.CustomAdapter
    </ADAPTERCLASS>
25: <DISPLAYFORUPLOAD>false</DISPLAYFORUPLOAD>
26: <ADAPTERSETTINGS>
```

The custom file adapter is shown for further detail about processing file formats that are specific to a customer.

```
1:  <!-- Custom upload file definition for Positive Pay Chec
    k Record -->
2:  <OUTPUTFORMAT>
3:      <NAME>Positive Pay Check Record</NAME>
4:      <FIELDDEFINITIONLIST>
5:          <FIELDDEFINITION>
6:              <NAME>Account Number</NAME>
7:          </FIELDDEFINITION>
8:          <FIELDDEFINITION>
9:              <NAME>Routing Number</NAME>
10:         </FIELDDEFINITION>
11:         <FIELDDEFINITION>
12:             <NAME>Check Number</NAME>
13:         </FIELDDEFINITION>
14:         <FIELDDEFINITION>
15:             <NAME>Check Date</NAME>
16:         </FIELDDEFINITION>
17:         <FIELDDEFINITION>
18:             <NAME>Amount</NAME>
19:         </FIELDDEFINITION>
20:         <FIELDDEFINITION>
21:             <NAME>Void Check</NAME>
22:         </FIELDDEFINITION>
23:         <FIELDDEFINITION>
24:             <NAME>Additional Data</NAME>
25:         </FIELDDEFINITION>
26:     </FIELDDEFINITIONLIST>
27:     <CATEGORIES>
28:         <CATEGORY>PPAY</CATEGORY>
29:     </CATEGORIES>
30:
31:     <CMADAPTERCLASS>com.ffusion.fileimporter.fileadap
        ters.custom.
        CustomPPayCheckRecord</CMADAPTERCLASS>
32:     </OUTPUTFORMAT>
33:     </ADAPTERSETTINGS>
34:     </FILEADAPTER>
35:     </XML>
```

While the invention is described in some detail with specific reference to a single-preferred embodiment and certain alternatives, there is no intent to limit the invention to that particular embodiment or those specific alternatives.

For instance, those skilled in the art will appreciate that modifications may be made to the preferred embodiment without departing from the teachings of the present invention.

The invention claimed is:

1. A computer-implemented system for consolidating financial transaction information from multiple sources for presentation to a user, the system comprising:
   a file importer for importing data files from a first source and processing each data file to create parsed information for each transaction present in the data file and represent any additional information present in the data file in Extensible Markup Language (XML) format;
   a data consolidator for receiving parsed information from the file importer, consolidating said parsed information with transaction information from a user-accessible system to create consolidated transaction records, assigning a unique identifier to each consolidated transaction record for an account, and storing said consolidated transaction records, wherein consolidating said parsed information includes removing transaction information derived from the user accessible system that is duplicated in said parsed information from the data files;
   a reporting module for receiving a request for financial transaction information for a particular account and presenting consolidated transaction records for the particular account to the user in response to the request, wherein the user may navigate through said consolidated transaction records based upon said unique identifier; and
   at least one computer having a processor and memory for operating the file importer, data consolidator and reporting module.

2. The system of claim 1, wherein said file importer includes at least one file adapter for extracting data from a particular type of data file.

3. The system of claim 2, wherein said at least one file adapter includes a Bank Administration Institute (BAI) file adapter for extracting data from a Bank Administration Institute (BAI) data file.

4. The system of claim 1, wherein said file importer is user extensible to extract data from additional types of data files.

5. The system of claim 1, wherein said file importer is invoked at periodic intervals to process data files received from said first source.

6. The system of claim 1, wherein said first source is an external source.

7. The system of claim 6, wherein said external source is a financial institution.

8. The system of claim 1, wherein said data consolidator creates consolidated transaction records based on transaction information in the user-accessible system that is more recent than information from the data files received from the first source.

9. The system of claim 1, wherein said XML representation is stored by the data consolidator for retrieval in response to a user request for financial transaction information.

10. The system of claim 1, wherein said unique identifier assigned to a transaction record comprises a sequence number.

11. The system of claim 10, wherein said data consolidator assigns a sequence number per account and per type of transaction.

12. The system of claim 11, wherein said data consolidator assigns consecutive sequence numbers to transaction records of a given type for a particular account.

13. The system of claim 11, wherein said data consolidator assigns date-based sequence numbers to transaction records of a given type for a particular account.

14. The system of claim 1, wherein the data consolidator is user configurable to assign a unique identifier to transaction records using a selected one of consecutive sequence numbers and date-based sequence numbers.

15. The system of claim 1, wherein the data consolidator provides for undoing transaction records created from a particular file in response to a user request to undo a particular file.

16. The system of claim 15, wherein the data consolidator identifies dependent files having transaction records dependent on transaction records created from said particular file.

17. The system of claim 16, wherein said dependent files are reprocessed by the data consolidator in response to the user request to undo the particular file.

18. The system of claim 1, wherein the reporting module presents at least one page containing said consolidated transaction records in a user interface.

19. The system of claim 18, wherein a user may select a particular page of said consolidated transaction records for viewing in the user interface.

20. The system of claim 1, wherein the reporting module retrieves consolidated transaction records matching criteria specified by the user in the request for financial transaction information.

21. A method implemented in a computer system having at least a processor and memory for consolidating and presenting financial information to a user, the method comprising:
 importing data files of different types into the system;
 for each particular type imported, loading a file adapter suited for processing that particular type;
 for each imported data file, creating parsed information from the data file that identifies each transaction present in the data file with a unique sequence number, and that represents any additional information present in the data file in XML format;
 creating consolidated financial information by storing all parsed information in a consolidation repository, including removing financial information derived from a user accessible system which is duplicated in said parsed information;
 receiving a user request at the user-accessible system for information about a particular financial account; and
 in response to the user request, determining financial information in the user-accessible system and the consolidation repository that is most current for the particular financial account, and presenting that financial information to the user.

22. The method of claim 21, wherein the importing step occurs at periodic intervals.

23. The method of claim 21, wherein the data file's file type comprises a BAI file type, and wherein the file adapter is suited for processing BAI files.

24. The method of claim 21, wherein the file adapter is implemented as a pluggable architecture for supporting a particular file type.

25. The method of claim 21, wherein each sequence number assigned is a unique identifier.

26. The method of claim 21, wherein each sequence number assigned is a date-based sequence number.

27. The method of claim 21, wherein the user-accessible system comprises a main back-end database system for a bank.

28. The method of claim 21, wherein each imported data file is received from an external source.

29. The method of claim 28, wherein the external source is a banking institution.

30. The method of claim 21, wherein the consolidation repository stores financial information in database tables.

31. The method of claim 21, wherein the determining step includes consolidating financial information from the user-accessible system with financial information from the consolidation repository.

32. The method of claim 31, wherein any duplicate information already stored in the consolidation repository is ignored.

33. The method of claim 21, further comprising:
 for any new financial information in the user-accessible system that is not already present in the consolidation repository, creating new parsed information from the new financial information that identifies each transaction present with a unique sequence number, and that represents any additional information present in the data file in XML format; and
 updating the consolidated financial information in the consolidation repository to include the new parsed information.

34. A non-transitory computer-readable medium having processor-executable instructions for performing the method of claim 21.

35. A computer-implemented system for consolidating and presenting financial information to a user comprising:
 a file importer for importing data files of different types;
 a plurality of file adapters, each file adapter suited for processing a particular type of data file imported by creating parsed information from the data file that identifies each transaction present in the data file with a unique sequence number, and by representing any additional information present in the data file in XML format for each imported data file;

a consolidator for consolidating financial information by consolidating parsed information from imported data files with data from a user-accessible system, including removing transaction information derived from the user accessible system duplicated in said parsed information;

a consolidation repository for storing consolidated financial information;

a user-accessible system for receiving a user request for information about a particular financial account; and a module for determining financial information in the user-accessible system and the consolidation repository that is most current for the particular financial account, and presenting that financial information to the user; and at least one computer having a processor and memory for operating the file importer, file adapters, consolidator, consolidation repository, user accessible system and module for determining financial information.

36. The system of claim 35, wherein the file importer operates at periodic intervals.

37. The system of claim 35, wherein one type comprises a BAI file type, and wherein one of the file adapters is suited for processing BAI files.

38. The system of claim 35, wherein the file adapters are implemented as a pluggable architecture for supporting different file types.

39. The system of claim 35, wherein each sequence number assigned is a unique identifier.

40. The system of claim 35, wherein each sequence number assigned is a date-based sequence number.

41. The system of claim 35, wherein the user-accessible system comprises a main back-end database system for a bank.

42. The system of claim 35, wherein each imported data file is received from an external source.

43. The system of claim 42, wherein the external source is a banking institution.

44. The system of claim 35, wherein the consolidation repository stores financial information in database tables.

45. The system of claim 35, wherein the module for determining and presenting consolidates financial information from the user-accessible system with financial information from the consolidation repository.

46. The system of claim 45, wherein any duplicate information already stored in the consolidation repository is ignored.

47. The system of claim 35, further comprising:

a module for updating the parsed information with new financial information any new financial information in the user-accessible system that is not already present in the consolidation repository.

* * * * *